United States Patent
Wang et al.

(10) Patent No.: US 10,230,790 B2
(45) Date of Patent: Mar. 12, 2019

(54) CONTEXT MANAGEMENT

(71) Applicant: Convida Wireless, LLC, Wilmington, DE (US)

(72) Inventors: Chonggang Wang, Princeton, NJ (US); Zongrui Ding, Portland, OR (US); Qing Li, Princeton Junction, NJ (US); Hongkun Li, Malvern, PA (US); Paul L. Russell, Pennington, NJ (US)

(73) Assignee: Convida Wireless, LLC, Wilmington, DE (US)

( * ) Notice: Subject to any disclaimer, the term of this patent is extended or adjusted under 35 U.S.C. 154(b) by 1 day.

(21) Appl. No.: 14/310,620

(22) Filed: Jun. 20, 2014

(65) Prior Publication Data
US 2014/0379804 A1    Dec. 25, 2014

Related U.S. Application Data

(60) Provisional application No. 61/837,845, filed on Jun. 21, 2013, provisional application No. 61/844,689,
(Continued)

(51) Int. Cl.
*G06F 15/16* (2006.01)
*H04L 29/08* (2006.01)
*H04L 29/06* (2006.01)

(52) U.S. Cl.
CPC .......... *H04L 67/104* (2013.01); *H04L 67/16* (2013.01); *H04L 67/2833* (2013.01); *H04L 69/24* (2013.01)

(58) Field of Classification Search
CPC ... H04L 67/104; H04L 69/24; H04L 67/2833; H04L 67/16; H04L 29/08
See application file for complete search history.

(56) References Cited

U.S. PATENT DOCUMENTS 7,352,770 B1 *  4/2008  Yonge, III .............. H04B 3/54
                                                   370/445
7,469,297 B1 * 12/2008  Kostoff, II ........ H04L 29/12839
                                                   370/392
(Continued)

FOREIGN PATENT DOCUMENTS

CN         1989703 A     6/2007
CN       101795500 A     8/2010
(Continued)

OTHER PUBLICATIONS

Ersue et al, "Management of Networks with Constrained Devices: Use Cases draft-ietf-opsawg-coman-use-cases-01", The Internet Engineering Task Force(IETF), Feb. 14, 2014, 30 pages.
(Continued)

*Primary Examiner* — Cheikh T Ndiaye
(74) *Attorney, Agent, or Firm* — Baker & Hostetler, LLP

(57) ABSTRACT

Systems, methods, and apparatus embodiments are described herein for context information management at the medium access control layer. In one embodiment, a system comprises a plurality of peers which communicate via peer-to-peer communications. In the system, context information may be exchanged at the MAC layer. Examples of context information include, without limitation, location information, mobility information, device capability, user information, an application category, multi-hop information, a channel condition, application information, association identifiers, and device information. Each of the plurality of peers may include a context manager that resides on each peer device. For example, a first context manager that resides on a first peer of the plurality of peers may exchange context information with a second context manager that resides on a second peer of the plurality of peers. In another example embodiment, the first peer, and in particular the first
(Continued)

context manager that resides on the first peer, can retrieve the context information from a layer that is different than the MAC layer.

14 Claims, 16 Drawing Sheets

Related U.S. Application Data filed on Jul. 10, 2013, provisional application No. 61/837,993, filed on Jun. 21, 2013.

(56) References Cited

U.S. PATENT DOCUMENTS

| | | | |
|---|---|---|---|
| 7,660,860 | B2 | 2/2010 | Yoon et al. |
| 7,730,208 | B2 | 6/2010 | Saha et al. |
| 7,787,397 | B2 | 8/2010 | Olvera-Hernandez |
| 8,041,380 | B2 | 10/2011 | Hamdi et al. |
| 8,175,627 | B2 | 5/2012 | Shon et al. |
| 8,285,319 | B2 | 10/2012 | Shin et al. |
| 8,315,564 | B2 | 11/2012 | Banerjea |
| 8,363,586 | B2 | 1/2013 | Rosario et al. |
| 8,738,093 | B1 | 5/2014 | Gopalakrishnan et al. |
| 8,880,009 | B2 | 11/2014 | Baldessari et al. |
| 8,892,032 | B2 | 11/2014 | Madhukar LeLe et al. |
| 8,958,838 | B2 | 2/2015 | Patel et al. |
| 9,098,177 | B2 | 8/2015 | Das |
| 9,210,085 | B2 | 12/2015 | Harrison |
| 9,232,393 | B2 | 1/2016 | Van Phan et al. |
| 2002/0132586 | A1 | 9/2002 | Chen et al. |
| 2002/0159395 | A1 | 10/2002 | Nelson et al. |
| 2003/0212822 | A1* | 11/2003 | Saha .................. H04B 7/18586 709/245 |
| 2003/0212827 | A1* | 11/2003 | Saha .................. H04B 7/18586 709/247 |
| 2005/0068916 | A1 | 3/2005 | Jacobsen et al. |
| 2005/0193106 | A1 | 9/2005 | Desai et al. |
| 2006/0009159 | A1 | 1/2006 | Leung |
| 2006/0013256 | A1* | 1/2006 | Lee .................. H04W 28/06 370/473 |
| 2006/0166690 | A1 | 7/2006 | Nishio et al. |
| 2006/0248525 | A1 | 11/2006 | Hopkins |
| 2006/0253736 | A1 | 11/2006 | Rudolf et al. |
| 2007/0005775 | A1 | 1/2007 | Philips |
| 2007/0104116 | A1 | 5/2007 | Olvera-Hernandez |
| 2007/0115829 | A1 | 5/2007 | Strutt et al. |
| 2007/0253352 | A1 | 11/2007 | Arisha et al. |
| 2008/0055068 | A1 | 3/2008 | Van et al. |
| 2008/0068217 | A1* | 3/2008 | Van Wyk .................. G01D 4/004 340/870.11 |
| 2008/0134271 | A1 | 6/2008 | Qin et al. |
| 2008/0170541 | A1 | 7/2008 | Vartiainen et al. |
| 2008/0268892 | A1 | 10/2008 | Hamdi et al. |
| 2009/0029650 | A1 | 1/2009 | Shon et al. |
| 2009/0104875 | A1* | 4/2009 | Naniyat .................. H04W 76/02 455/41.3 |
| 2009/0204354 | A1 | 8/2009 | Davis et al. |
| 2009/0213774 | A1 | 8/2009 | Chapman et al. |
| 2009/0311961 | A1 | 12/2009 | Banerjea |
| 2009/0325484 | A1* | 12/2009 | Lele .................. H04W 8/205 455/41.1 |
| 2010/0103870 | A1* | 4/2010 | Garcia-Luna-Aceves .................. H04W 40/02 370/328 |
| 2010/0110999 | A1 | 5/2010 | Li et al. |
| 2010/0150027 | A1 | 6/2010 | Atwel |
| 2010/0165961 | A1* | 7/2010 | Rosario .................. H04W 8/005 370/338 |
| 2010/0198459 | A1 | 8/2010 | Kosai et al. |
| 2010/0232333 | A1 | 9/2010 | Higuchi et al. |
| 2010/0233963 | A1 | 9/2010 | Harada et al. |
| 2010/0235925 | A1 | 9/2010 | Lee |
| 2010/0248727 | A1 | 9/2010 | Karaoguz et al. |
| 2010/0323717 | A1 | 12/2010 | Agashe et al. |
| 2011/0082939 | A1 | 4/2011 | Montemurro et al. |
| 2011/0117852 | A1 | 5/2011 | Copeland et al. |
| 2011/0173331 | A1 | 7/2011 | Setton et al. |
| 2011/0182280 | A1 | 7/2011 | Charbit et al. |
| 2011/0201275 | A1 | 8/2011 | Jabara et al. |
| 2011/0225368 | A1* | 9/2011 | Burge, III ........... G06F 12/0862 711/118 |
| 2012/0135778 | A1 | 5/2012 | Tian |
| 2012/0142392 | A1 | 6/2012 | Patel et al. |
| 2012/0184321 | A1 | 7/2012 | Baldessari et al. |
| 2012/0201158 | A1 | 8/2012 | Geirhofer et al. |
| 2012/0296995 | A1 | 11/2012 | Yan |
| 2012/0314600 | A1 | 12/2012 | Zeira |
| 2013/0034064 | A1 | 2/2013 | Nam et al. |
| 2013/0044681 | A1 | 2/2013 | Abraham et al. |
| 2013/0058288 | A1 | 3/2013 | Nentwig |
| 2013/0077661 | A1 | 3/2013 | Jacobsen et al. |
| 2013/0148517 | A1 | 6/2013 | Abraham et al. |
| 2013/0250931 | A1 | 9/2013 | Abraham et al. |
| 2013/0288601 | A1 | 10/2013 | Chhabra |
| 2013/0297810 | A1 | 11/2013 | Ho et al. |
| 2013/0317892 | A1 | 11/2013 | Heerboth |
| 2014/0105186 | A1 | 4/2014 | Park et al. |
| 2014/0108868 | A1 | 4/2014 | Neerincx et al. |
| 2014/0126655 | A1 | 5/2014 | Vijayasankar et al. |
| 2014/0153500 | A1 | 6/2014 | Duan et al. |
| 2014/0173447 | A1* | 6/2014 | Das ..................... G06F 3/04842 715/738 |
| 2014/0359148 | A1 | 12/2014 | Cherian |
| 2014/0372774 | A1 | 12/2014 | Li et al. |
| 2014/0372775 | A1 | 12/2014 | Li et al. |
| 2015/0133083 | A1 | 5/2015 | Van et al. |
| 2015/0223111 | A1 | 8/2015 | Lindoff et al. |
| 2016/0295521 | A1 | 10/2016 | Grayson et al. |

FOREIGN PATENT DOCUMENTS

| | | |
|---|---|---|
| CN | 102165840 A | 8/2011 |
| CN | 102695131 A | 9/2012 |
| CN | 102893589 A | 1/2013 |
| CN | 103037489 A | 4/2013 |
| EP | 2701457 A1 | 2/2014 |
| FR | 2 910 764 | 6/2008 |
| JP | 2001-308786 A | 11/2001 |
| JP | 2005-057602 A | 3/2005 |
| JP | 2006-050510 A | 2/2006 |
| JP | 2006-054707 A | 2/2006 |
| JP | 2006-148914 A | 6/2006 |
| JP | 2007-150745 A | 6/2007 |
| JP | 2008-077421 A | 4/2008 |
| JP | 2008-538465 A | 10/2008 |
| JP | 2009-038659 A | 2/2009 |
| JP | 2009-536002 A | 10/2009 |
| JP | 2009-538465 A | 11/2009 |
| JP | 2010-130096 A | 6/2010 |
| JP | 2010-165351 A | 7/2010 |
| JP | 2010-183178 A | 8/2010 |
| JP | 2011-014022 A | 1/2011 |
| JP | 2011-239210 A | 11/2011 |
| JP | 2012-147146 A | 8/2012 |
| JP | 2014-527750 A | 10/2014 |
| KR | 10-2010-0080406 A | 7/2010 |
| KR | 10-2011-0093870 A | 8/2011 |
| WO | 2006/110492 A2 | 10/2006 |
| WO | 2007/130883 A2 | 11/2007 |
| WO | 2012/144707 A1 | 10/2012 |
| WO | 2013/022244 A2 | 2/2013 |
| WO | 2014/186261 | 11/2014 |
| WO | WO 2014-201240 | 12/2014 |
| WO | WO 2014-201251 | 12/2014 |
| WO | WO 2014-205370 | 12/2014 |
| WO | WO 2015-006585 | 1/2015 |

(56) References Cited

OTHER PUBLICATIONS

Heile,R., "Wireless Medium Access Control (MAC) and Physical Layer (PHY) Specifications for Peer Aware Communications (PAC)", Feb. 8, 2012, 2 pages.

IEEE 802.154k, IEEE Standard for Local and metropolitan area networks—"Part 15.4: Low-Rate Wireless Personal Area Networks (LR-WPANs) Amendment 5: Physical Layer Specifications for Low Energy, Critical Infrastructure Monitoring Networks", Jun. 14, 2013, 149 pages.

IEEE 802.15.4, IEEE Standard for Local and metropolitan area networks—"Part 15.4: Low-Rate Wireless Personal Area Networks (LR-WPANs)", Sep. 5, 2011, 314 pages.

International Application No. PCT/US2014/042107: International Search Report and Written Opinion dated Oct. 28, 2014, 25 pages.

International Application No. PCT/US2014/042128: International Search Report and Written Opinion dated Oct. 28, 2014, 20 pages.

International Application No. PCT/US2014/043449: International Search Report and Written Opinion dated Nov. 24, 2014, 8 pages.

International Application No. PCT/US2014/046193: International Search Report and Written Opinion dated Nov. 28, 2014, 8 pages.

Lee, M., IEEE P802.15 "PAC Introduction", Jan. 2012, 20 pages.

Lee, M., IEEE P802.15 "Peer Aware Communications (PAC) Study Group 5 Criteria", Jan. 2012, 4 pages.

Liu et al, "MAC Proposals for Low Energy Critical Infrastructure Networks", IEEE 802.15.4k, Jul. 18, 2011, 13 pages.

Liu et al, "Consideration on MAC Enhancement of IEEE 802.15. 4-2006", IEEE, Jul. 6, 2007, 9 pages.

Meyer,D. and Feamster, N., "Proto-SDNRG Meeting", IETF 84, Apr. 2012.

3rd Generation Partnership Project (3GPP); TR 22.803 V0.2 .0; 3rd Generation Partnership Project; Technical Specification Group SA; Feasibility Study for Proximity Services (ProSe), (Release 12), Feb. 2012, 18 pages.

3rd Generation Partnership Project (3GPP); S1-120059, "Suggested D2D Terminologies (Operator Managed, Operator Assisted, Operator Free)", 3GPP TSG-SA WG1 Meeting #57, Kyoto, Japan, Feb. 13-17, 2012, 3 pages.

Shelby et al, "Constrained Application Protocol (CoAP) draft-shelby-core-coap-01", The Internet Engineering Task Force(IETF), May 10, 2010, 33 pages.

Yedavalli, K. and Krishnamachari, B., "Enhancement of the IEEE 802.15.4 MAC Protocol for Scalable Data Collection in Dense Sensor Networks", 2006, 10 pages.

Japanese Patent Application No. 2016-521854: Notice of Reasons for Rejection dated Feb. 1, 2017, 9 pages.

Park et al., "TG8 Technical Guide Document", IEEE 802.15-1210568 r5, Wireless Personal Area Networks, Mar. 19, 2013, 14 pages.

Lee, M., "PAC Introduction", IEEE 802.15-12-0004-01-0pac, Jan. 18, 2012, 20 pages.

Kwak et al., "Proposed Text on Transmit Power Control for TGD", IEEE 15-13-0020-00-0008, Working Group for Wireless Personal Area Networks, Jan. 11, 2013, 3 pages.

Ho, Some Proposed Changes to IEEE P802.15.6/D01 MAC and Security Subclasses, IEEE 8021 5-10/0678r0, IEEE, Oct. 2010, pp. 19-28, searched date Aug. 9, 2018.

English Translation of JP Office Action dated Sep. 11, 2018 for JP Application No. 2017233480.

English Translation of JP Office Action dated Aug. 15, 2018 for JP Application No. 2017224729.

* cited by examiner

Fig. 9A

Beacon Header: Frame Control | Sequence Number | Address Fields (832) | P2PNW/APP ID (834) | Context Category (836) | Hopper Indication (838) | Aux Security Header | Information Elements (IE): Header IEs, Payload IEs Beacon Payload: Frame Information (840) | Other Beacon Payload (830) | FCS

MFR

Fig. 9B

840a: Superframe Length | Num of CCDCH Slots (842) | CCDCH Slot Size (844) | Application Frame List (846)

Fig. 9C

840b: Application Frame Length (848) | Num of DCDCH Slots (850) | Num of CFP Slots | Slot Size | GTS Fields | Super/Common Beacon Offset (852)

Fig. 10A — MAC Payload fields: Device Capability (862), Assoc Type (864), Required Duration (866), VL Indication (868), Response Type (870), Multi-hop Indication (872), Short Address Required, Security Level, Other MAC Payload, FCS, MFR. MAC Header. (860)

Fig. 10B — MAC Payload fields: Device Capability (882), Assoc Type (884), Assoc Decision (886), Assoc ID (888), Assigned Duration (890), VL Indication (892), Multi-hop Indication (894), Assigned Short Address, Security Level, Other MAC Payload, FCS, MFR. MAC Header. (880)

Fig. 10C — MAC Payload fields: Assoc ID (902), Disassoc Reason (904), Disassoc Duration (906), Multi-hop Indication (908), Number of Associated Peers (910), Multi-hop Peer ID (912), FCS, MFR. MAC Header. (900)

CONTEXT MANAGEMENT

CROSS REFERENCE TO RELATED APPLICATIONS

This application claims the benefit of U.S. Provisional Patent Application Ser. No. 61/837,845, filed Jun. 21, 2014, U.S. Provisional Patent Application Ser. No. 61/844,689, filed Jul. 10, 2013, and of U.S. Provisional Patent Application No. 61/837,993, filed Jun. 21, 2013, the disclosures of all of which are hereby incorporated by reference as if set forth in their entireties herein.

BACKGROUND

Peer-to-peer (P2P) proximity communication may refer to infrastructure-based or infrastructure-less communications between peers within a proximity of each other. A peer may refer to a user or a device such as, for example, a mobile station (MS) in a 2G system, or a full-function device (FFD) or reduced-function device (RFD) in a IEEE 802.15 wireless personal area network (WPAN). Examples of P2P devices include connected cars, medical devices, smart meters, smart phones, tablets, laptops, game consoles, set-top boxes, cameras, printers, sensors, home gateways, and the like. P2P proximity communication may focus on a peer being aware of its proximity for desired services in an infrastructure-based or infrastructure-less configuration. For example, P2P communications may be implemented in a centralized system that includes a centralized controller or a fully distributed system without a central controller. In contrast to infrastructure-less P2P communications, infrastructure-based communications often include a centralized controller, for example, for handling user information, scheduling among users, and managing connections (e.g., cellular communications). In infrastructure-less P2P communications, peers typically have equal responsibility for initiating, maintaining, and terminating a communication session. Proximity-based applications and services represent a recent socio-technological trend. P2P proximity communications are used in various implementations including, for example, social networking, advertising, emergency situations, gaming, smart transportation, and network of network scenarios.

In typical social network implementations, peers in proximity can interact with each other at the application level (e.g., Facebook, Twitter). Two-way communication among two or more peers is often required in social network implementations of P2P proximity communications. Traffic data rates may be low (e.g., text-based chatting) or high (e.g., content sharing). In an example advertising implementation of P2P proximity communications, a store broadcasts its promotions and coupons to potential customers (peers) who are within a proximity to the store's location. In this example scenario, one-way communication with low data traffic is typical, but be two-way communication may be used (e.g., for personalized advertisements).

Implementation of P2P proximity communications in emergency situations usually involves one-way communication, such as an emergency alarm for example. Other emergency implementations need two-way communication, such as during an emergency safety management scenario. An emergency service/application of P2P may have higher priority than other P2P services/applications, and some emergency services/applications may have higher privacy requirements. In an example gaming implementation of P2P, multiple peers initialize or participate in interactive games, such as online multiplayer gaming following certain rules for example. Interactive P2P gaming often requires low latency. In an example smart transportation implementation of P2P proximity communication, connected cars via car-to-car and/or car-to-infrastructure communication can support advanced applications including, for example, congestion/accident/event notification, interactive transportation management such as carpooling and train scheduling, smart traffic control, and the like. Data rates in smart transportation implementations are often low, but smart transportation may require highly reliable message delivery and very low latency. Network to Network P2P may be used for extending the coverage of infrastructure or offloading from infrastructure. Multi-hop may be a unique feature.

The example implementations of P2P communications described above may relate to machine-to-machine (M2M) and Internet of Things (IoT) applications. Existing approaches to proximity communications for M2M/IoT applications have performance issues. For example, context information is often managed in an isolated manner such that the context information is not shared between various layers or peers.

SUMMARY

Current approaches to managing context information, such as location information, mobility information, device capability, user information, an application category, multi-hop information, a channel condition, application information, association identifiers, device information, or the like, lack capabilities in a peer-to-peer (P2P) system. For example, context information is often managed in an isolated manner such that the context information is not shared between various layers or peers. Systems, methods, and apparatus embodiments are described herein for context information management at the medium access control (MAC) layer.

In accordance with an example embodiment, a system comprises a plurality of devices that communicate via peer-to-peer communications. Each peer device may include a context manager. A first context manager of a first device of the plurality of devices may receive a context information request frame comprising one or more parameters. The one or more parameters may be indicative of at least one of a list of context operations, a list of context identities, or a response type. Based on the context information request frame, the first device may generate one or more context information response frames that are indicative of at least one of a number of remaining responses, an acknowledgement requirement applicable to a select one of the one or more context frames, a list of operations applicable to the select one of the one or more context frames, a list of context identities applicable to the select one of the one or more context frames, or one or more context values. The context information request frame may be received over a medium access control (MAC) layer. Further, the first device may send, over the MAC layer the select one of the one or more context frames to a second context manager of a second device of the plurality of devices.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

FIG. 9A illustrates an exemplary, non-limiting modified and/or extended beacon frame format according to an embodiment.

FIG. 9B illustrates an exemplary, non-limiting superframe information format according to an embodiment.

FIG. 9C illustrates an exemplary, non-limiting application frame information format according to an embodiment.

FIG. 10A illustrates an exemplary, non-limiting association request frame format according to an embodiment.

FIG. 10B illustrates an exemplary, non-limiting association response frame format according to an embodiment.

FIG. 10C illustrates an exemplary, non-limiting disassociation request frame format according to an embodiment

DETAILED DESCRIPTION OF ILLUSTRATIVE EMBODIMENTS

Figure 1:
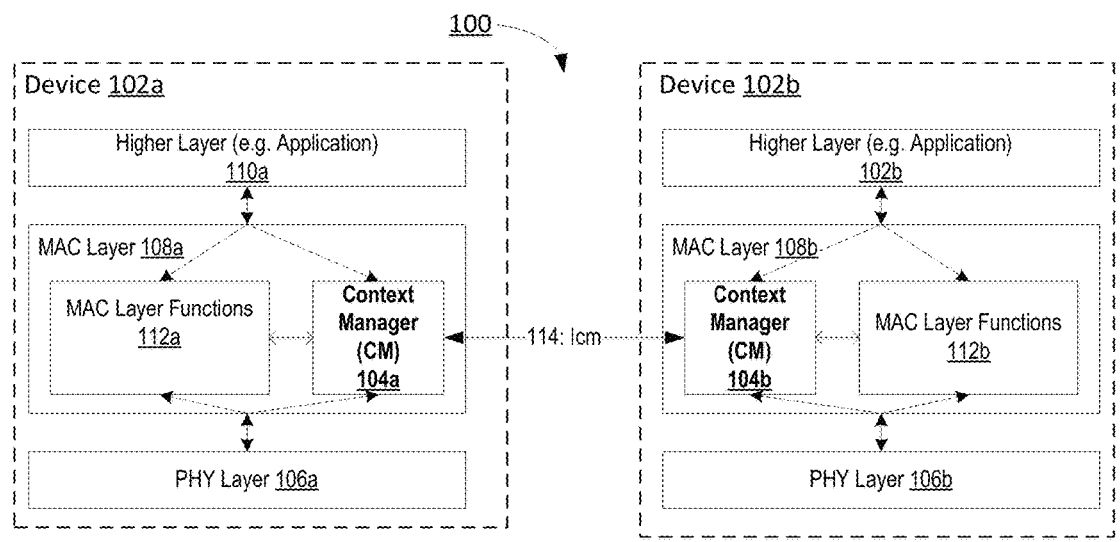
FIG. 1 is a block diagram that depicts a context management architecture for proximity communications according to an example embodiment.

Peer-to-peer (P2P) networks (P2PNWs) may be formed by a desired context such as, for example, an application or service. Context information from different layers may be highly involved in the management of the P2P communication. As used herein, context information may generally refer to information that can be used to describe, track, and/or infer the situational state or condition of a service, an application, a device, a network, or a combination thereof. Examples of context information include, presented by way of example and without limitation, location information, time information, an application category, a service power category, any user information, multi-hop information, mobility information, channel condition information, association information, device information, other application or service information, or the like. The existing approach to handling context information is typically done in an isolated way. For example, the context information may be stored at a layer or an entity and is not passed between layers or the entity. This approach may be inefficient for P2P communications. For example, when a P2PNW is formed, the peer discovery/association may involve decisions based on application information, and may involve measurements from lower layers. As used herein, peer discovery may refer to a process that is used for a peer to find one or more other peers before peer association to enable P2P proximity communications. Peer association may refer to a process used for a peer to establish a logical relationship with one or more other peers before P2P data transmission can commence. Peer association may also be referred to as peer attachment, peering, pairing, or link establishment, without limitation. In accordance with an example embodiment, the context information is efficiently managed across different layers for P2P communications.

Often in existing approaches to handling context information, the context information from different applications is not shared. In P2P communications, the same context information may be involved in similar procedures. For example, location information can be shared by a gaming application, an advertisement/shopping application, and a social networking application. In accordance with an example embodiment, the context information for different applications is efficiently shared and managed such that various peers can request and access context information from different applications.

In an example embodiment, context information is directly exchanged between peers during P2P communication. For example, during the peer association for P2P communication, the context information (e.g., application information, association identifiers, user and/or device information) may be exchanged. Described below are messages and reference points for context management in P2P communications. For example, a Client/Server-based and proxy-based MAC-layer context management architecture are described below.

Various embodiments of context management functions and methods are further described herein. According to one embodiment, efficient context operations occur, between peers or devices, in which one context operation request may result in multiple MAC frames as responses. As described herein, efficient context operations may occur between protocol layers and functions on the same peer device. In another example embodiment, proxy-based context operations occur in which a peer can request or operate context information on behalf of other peers. In yet another example embodiment, session-based context operations occur in which multiple (e.g., two) peers or devices can establish a MAC-layer session to exchange context information continuously.

Applications (implementations) of proximity communications may benefit from exchanging context information among peers. By way of example, four peers may be within a proximity while playing an online game. The peers may exchange context information such as, for example and without limitation, their location information, mobility information, device capability (e.g., whether it supports voice, screen size, etc.), user information (e.g., level or familiarity with the game), or the like. Such context information exchanging may improve the gaming experience for a user. Although the example above depicts a scenario in which context information is exchanged between four devices, it will be understood that the exchange of context information may occur between any number of peer devices as desired.

Referring to FIG. 1, an example context management system 100 may include one or more peer devices 102 that communicate each via proximity communications. As illustrated, the context management system 100 includes a first peer device 102a and a second peer device 102b. As used herein, a peer device may be referred to simply as a peer, and a peer may refer to any device that is connected to another device via a communications channel or network. A peer may be a tablet, smart phone, music player, game console, personal digital assistant, laptop, PC, medical device, connected car, smart meter, home gateway, monitor, alarm, sensor, set-top box, printer, a mobile station (MS) in a 2G network, a user equipment (UE) in a 3G network, or one of a group of full-function devices (FFDs) or reduced function (RFDs) in IEEE 802.15 (wireless personal area network (WPAN)) networks. As one example, a peer may have the hardware architecture illustrated in FIG. 12C, which is described more fully below, or a variation thereof, or a peer may have the architecture of the computing system illustrated in FIG. 12D, which is also described more fully below. It will be appreciated that the example system 100 is simplified to facilitate description of the disclosed subject matter and is not intended to limit the scope of this disclosure. Other devices, systems, and configurations may be used to implement the embodiments disclosed herein in addition to, or instead of, a system such as the system 100, and all such embodiments are contemplated as within the scope of the present disclosure.

Referring to FIG. 1, the system 100 may include one or more context managers 104. Each peer device 102 in the system 100 may include a context manager (CM) 104. The context manager 104 of a device may be a hardware and/or software module executing on a processor of the device that manages context information associated with one or more peer devices. The illustrated first peer 102a includes a first context manager 104a, and the illustrated second peer 102b includes a second context manager 104b. The peer device 104a includes a physical (PHY) layer 106a, a medium access control (MAC) layer 108a, and layer that is higher than the MAC layer 108a, which is referred to as a higher layer 110a. The peer device 104b includes a physical (PHY) layer 106b, a medium access control (MAC) layer 108b, and layer that is higher than the MAC layer 108b, which is referred to as a higher layer 110b. The context managers 104a and 104b may function on the medium access control (MAC) layer 106, and thus the context managers 104a and 104b may be referred to generally as MAC layer logic functions, for example. Other MAC layer functions, for instance MAC layer logic functions 112a and 112b, may reside on the peer devices 104 at the MAC layer 108. The MAC layer logic functions 112a and 112b may include functionality such as, for example, discovery, association, relaying, or the like. Each of the context managers 104 may maintain a context database within their respective peer devices. Context information may be stored in the context database. The context database may contain context information associated with the peer device in which the context database resides. Additionally, or alternatively, the context database may contain context information associated with other peer devices that are located separately from the context database.

A context manager, for example the first CM 104a, may issue context management related requests to other context managers 104, for example the second CM 104b. The context managers 104 may also receive requests from other context managers 104, and generate responses to requests. In accordance with an example embodiment, the first context managers 104a may receive requests from the local higher layers 106a, the local MAC functions 112a, and the local physical (PHY) layer 106a. The CM 104a may respond to such requests. The CM 104a may be directly accessed by other MAC logic functions 108a such as, for example, discovery, association, relaying, or the like. The CM 104a may directly interact with higher layers 110a, such as one or more applications for example, and the PHY layer 108a, through inter-layer primitives.

With continuing reference to FIG. 1, a CM of a peer device, for instance the first CM 104a of the first device 102a, can communicate to the CM of another peer, for instance the second CM 104b of the second device 104b, through MAC layer frames over a CM interface (Icm) 114. When at least two context managers communicate with one another, a client/server model may be used in accordance with an example embodiment. For example, when the first CM 104a communicates with the second CM 104b, one of the context managers 104a and 104b may function as the client and the other of the context managers 104a and 104b may function as the server. Thus, a CM 104 may be referred to as a client CM (CMC) or a server CM (CMS). The client CM may send a request to the server CM and may wait for a response from the server CM. In an example embodiment, the server CM can simultaneously communicate with multiple other context managers on other peers via multicast/broadcast. In an example scenario in which a higher layer, PHY layer, or MAC-layer function cannot find required context information from the local CM (the CM on the same peer), the local CM can contact a remote CM (the CM on another peer) by sending a request for the required context information. The CM may perform context analytics or operations such as, for example, context filtering, context summarization, context aggregation, and the like.

Figure 2:
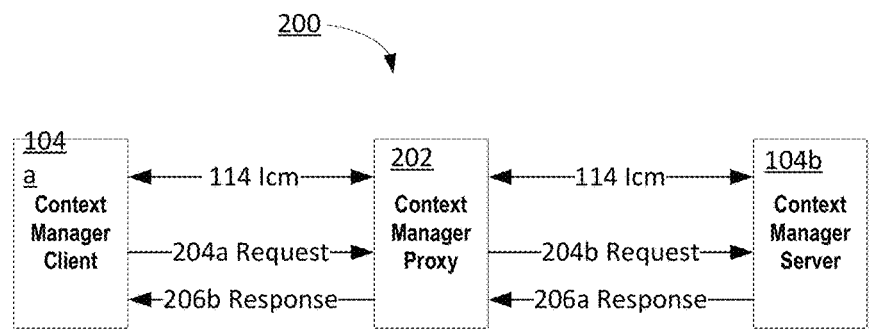
FIG. 2 is a block diagram that depicts a proxy-based context management architecture according to an example embodiment.

Referring to FIG. 2, an example proxy-based context management system 200 may include one or more peer devices 102 that communicate with each other via proximity communications. As illustrated, the system 200 includes the first CM 104a, which can perform as a client CM, and the second CM 104b, which can perform as a server CM. In accordance with the illustrated embodiment, the example system 200 includes a context manager proxy (CMP) 202 that may communicate with one or more context mangers 104. It will be appreciated that the example system 200 is simplified to facilitate description of the disclosed subject matter and is not intended to limit the scope of this disclosure. Other devices, systems, and configurations may be used to implement the embodiments disclosed herein in addition to, or instead of, a system such as the system 200, and all such embodiments are contemplated as within the scope of the present disclosure.

Still referring to FIG. 2, in accordance with the illustrated arrangement, the CM 102a may also be referred to as a context manager client (CMC) 102a, and the CM 102b may also be referred to as a context manager server (CMS) 102b. The CMC 102a may indirectly communicate with the CMS 102b via the CMP 202. The context managers 104a and 104b and the CMP 202 may function on the medium access control (MAC) layer 106, and thus the CMP 202 and the context managers 104a and 104b may be referred to generally as MAC layer functions. Further, the CM 104 of a peer device 102 may function as a combination of a CMC, CMP, and/or a CMS. Referring to FIG. 2, in accordance with the illustrated example, the CMC 104a may issue one or more requests 204 to the CMP 202, and the CMC 102a may receive one or more responses 206 from the CMP. When the CMP 202 receives a request 204a from the CMC 104a, the CMP 202 may perform various functions. For example, the CMP 202 may translate the request 204a to a format with which the CMS 104b can understand, if needed. The CMP may forward a request 204b, which may be a translated request, to the CMS 104b. In response to the request 204b, the CMS 104b may send a response 206a to the CMP 202, which may then send a response 206b to the CMC 104b. Alternatively, the CMP 202 may send the response 206b to the CMC 104a directly without contacting the CMS 104b. The CMS 104 may receive translated requests 204b from the CMP 202 and may send responses 206a back to the CMC 104a. By way of example, one game player in a group of players, which are peers, may act as the CMP 202 to manage and control an exchange of context information among the players. By way of further example, the CMP 202 in the gaming scenario may collect context information about peers such that the context information can be shared and discovered by other peers.

The context managers 102, as described above with respect to FIGS. 1 and 2, may perform various operations such as, presented by way of example and without limitation, remote context operations, local context operations, proxy-based context operations, and session-based context operations. In an example of remote context operations, a CM of one peer performs operations on context information that is maintained by other context managers of different peers. The remote context operations may include, for example, adding context information, retrieving context information, updating context information, subscribing to context information, aggregating multiple instances of context information, or the like. In accordance with an example embodiment, local context operations refer to context operations that are performed between a CM of an example peer, for example the first CM 104a of the first peer device 102a, and other layers of the peer device, for example the other MAC layer functions 112a or the PHY layer 106a of the peer device 102a. By way of further example, if the first CM 104a does not have context information that is required to perform a particular operation, the CM 104a may leverage remote context operations to contact a remote CM, such as the second CM 104b for example. Proxy-based context operations refer to operations in which one CM acts as a proxy to coordinate communications between a CMC and a CMS (see FIG. 2). Referring to FIG. 1, by way of example, the first CM 104a and the second CM 104b may establish a session at the MAC layer before exchanging context information. Thus, ensuing context operations may be referred to as session-based context operations, which may result in an efficient exchange of context information between the peer devices 102a and 102b.

Figure 3:
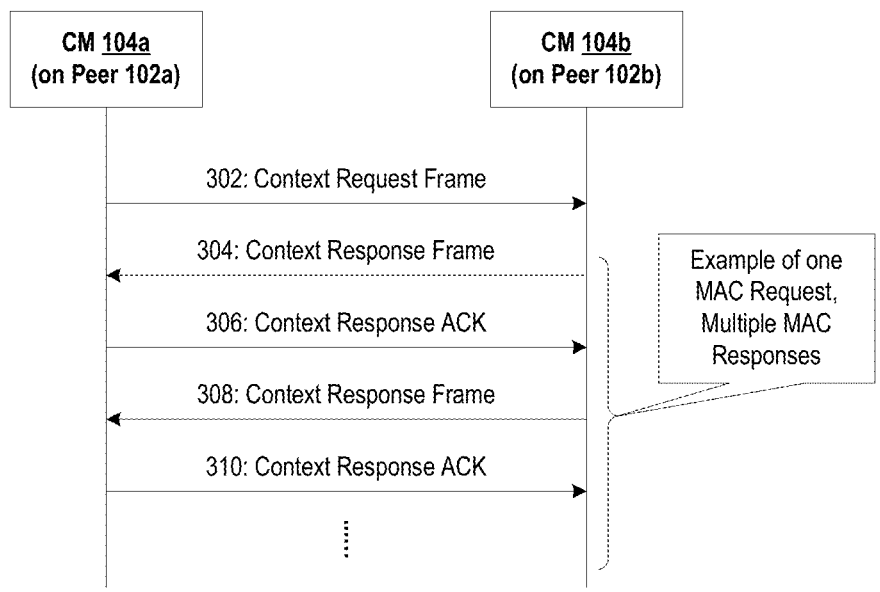
FIG. 3 is a call flow for remote context operations according to an example embodiment.

Referring now to FIG. 3, an example of remote context operations is illustrated, wherein the remote context operations are performed by the first peer 102a and the second peer 102b, and in particular the first CM 104a and the second CM 104b. In accordance with the illustrated embodiment, at 302, the first CM 104a sends a context information request frame to the second CM 104b. The context request frame, which may be referred to generally as a message, may contain various fields or parameters such as, for example, a list of context operations, a list of context identities, a response indication, or the like. Thus, the second CM 104b may receive one or more parameters that are indicative of at least one of a list of context operations, a list of context identities, or a response type. The context information request frame may be received over a medium access control (MAC) layer. The list of context operations may indicate the operations that are requested to be performed by the second CM 104b. The first CM 104a may request one or more, for instance multiple, operations in one context request frame. The list of context identities may indicate the context in which the operations will be performed on. Thus, a context ID may identify a context entity in the context database. The context entity may refer to a parameter, data set, application, service, peer device, or the like. The response indication may indicate whether the responses from the second CM 104b to the first CM 104a should be sent in one MAC frame or in separate MAC frames.

With continuing reference to FIG. 3, at 304, the second CM 104b may send a context information response frame to the first CM 104a. In some cases, the response for the first CM 104a may be too long to be included in one MAC frame. Thus, in such cases, multiple MAC frames may be used. The context response frame, which may be referred to generally as a message, may contain various fields or parameters such as, for example, a number of remained responses, an acknowledgement (ACK) indication, a list of operations, a list of context identities (IDs), context values, or the like. Thus, based on the context information request frame, the second device 102b, and in particular the second CM 104b, may generate one or more context information response frames that are indicative of at least one of a number of remaining responses, an acknowledgement requirement applicable to a select one of the one or more context frames, a list of operations applicable to the select one of the one or more context frames, a list of context identities applicable to the select one of the one or more context frames, or one or more context values. The context information request frame may be sent over the MAC layer. In an example embodiment, the number of remained response parameters indicates how many responses, and in particular how may context response frames, are remaining to be transmitted by the second CM 104b after the response is sent at 304. The ACK indication may indicate whether an acknowledgement is required for the context response frame that is sent at 304. For example, if the acknowledgment required, the first CM 104a may send an acknowledgement at 306. The ACK indication may also indicate whether an acknowledgement is required for each of the remaining responses or if an acknowledge is required for only a certain number (e.g., portion) of the responses. The list of operations may indicate one or more operations that correspond to the one or more responses. Example operations include, presented by way of example and without limitation, "get", "retrieve", or "report". The list of context IDs may indicate the context entities that correspond to the one or more responses. The context values may contain the values of requested context information or related context information. By way of example, requested context information, or the context entity, may relate to a speed, and thus the context value may be one or more speed values (e.g., 30 miles/hour, 65 miles/hour, etc.). By way of another example, requested context information may refer to a temperature associated with a peer device, and thus a context value that may be retrieved or reported may be a temperature value.

At 306, in accordance with the illustrated embodiment, the first CM 104a sends a context response ACK frame to the second CM 104b. As described above, the message sent at 304 may require such an acknowledgement to provide verification that the context response frame at 304 was received by the first CM 104a. At 308, the second CM 104b may send a remaining context response to the first CM 104a. The response sent at 308 may contain parameters that are at least similar to the parameters that are described above with reference to step 304. At 310, the first CM 104a sends a context response ACK to the second CM 104b. In an example embodiment, some or all of the above steps are repeated until all the responses that are required by the request at 302 are transmitted from the second CM 104b to the first CM 104a. Thus, while two context response frames are illustrated in FIG. 3, it will be understood that any number of context response frames may be required as desired. Further, it will be understood that any number of response acknowledgements may sent as required. Further still, though the number of illustrated context response frames is equal to the number of response acknowledgment frames, the number of response acknowledgements may vary as compared to the number of context response frames in accordance with an example embodiment.

Figure 4A:
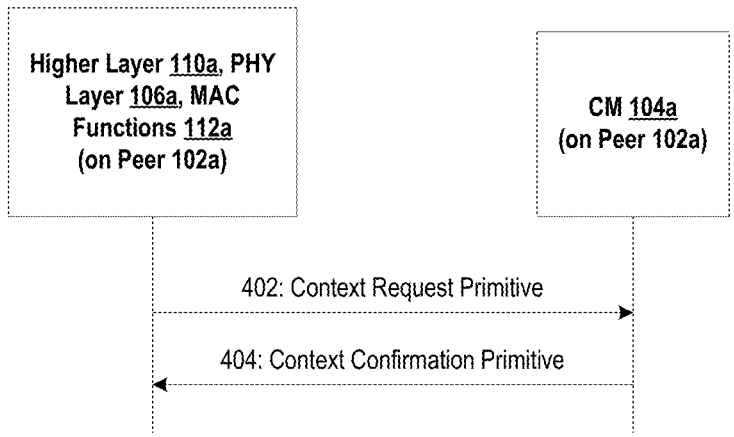
FIG. 4A illustrates a call flow for local context operations in accordance with an example embodiment.
Figure 4B:
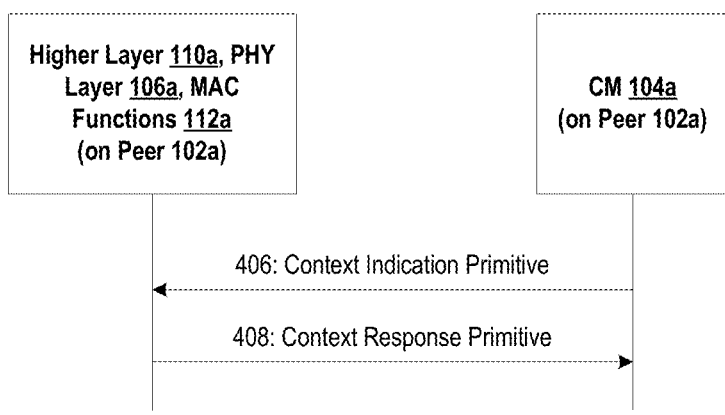
FIG. 4B illustrates another call flow for local context operations in accordance with another embodiment.

Referring now to FIGS. 4A and 4B, examples of local context operations are illustrated, wherein the local context operations are performed by the first peer 102a, and in particular the first CM 104a. Referring to FIG. 4A, in accordance with the illustrated embodiment, at 402, the higher layer 110a, the PHY layer 106a, or the MAC layer functions 108a issue a context request primitive to the first CM 104a. Thus, the first CM 104a of the first peer device 102a receives a context request primitive from another layer or MAC layer function of the first peer device 102a. The primitive may contain various information, such as, for example and without limitation, a primitive identifier (ID) that may indicate a type of the primitive, a list of context operations that are requested to be performed, a list of context IDs that may indicate the context IDs that the operation will be operated on, or the like. At 404, in accordance with the illustrated embodiment, the first CM 104a sends a context confirmation primitive to the higher layer 110a, the PHY layer 106a, or the MAC layer functions 108a. The primitive at 404 may contain the Primitive ID that indicates the type of the primitive. The primitive sent at 404 may further contain one or more context values, which may represent values of the requested context information.

Referring in particular to FIG. 4B, in accordance with the illustrated embodiment, at 406, the first CM 104a sends a context indication primitive to the higher layer 110a, the PHY layer 106a, or the MAC layer functions 108a. This primitive may contain, for example and without limitation, a primitive ID that indicates the type of the primitive, a list of context operations that may indicate operations that are to be performed, and a list of context IDs that may indicate the context IDs on which the operations will be performed. At 408, the higher layer 110a, the PHY layer 106a, or the MAC function may issue a context response primitive to the first CM 104a on the same peer (peer device 102a). The primitive may comprise the Primitive ID to indicate the type of the primitive and context values to indicate the values of the requested context information.

Figure 5:
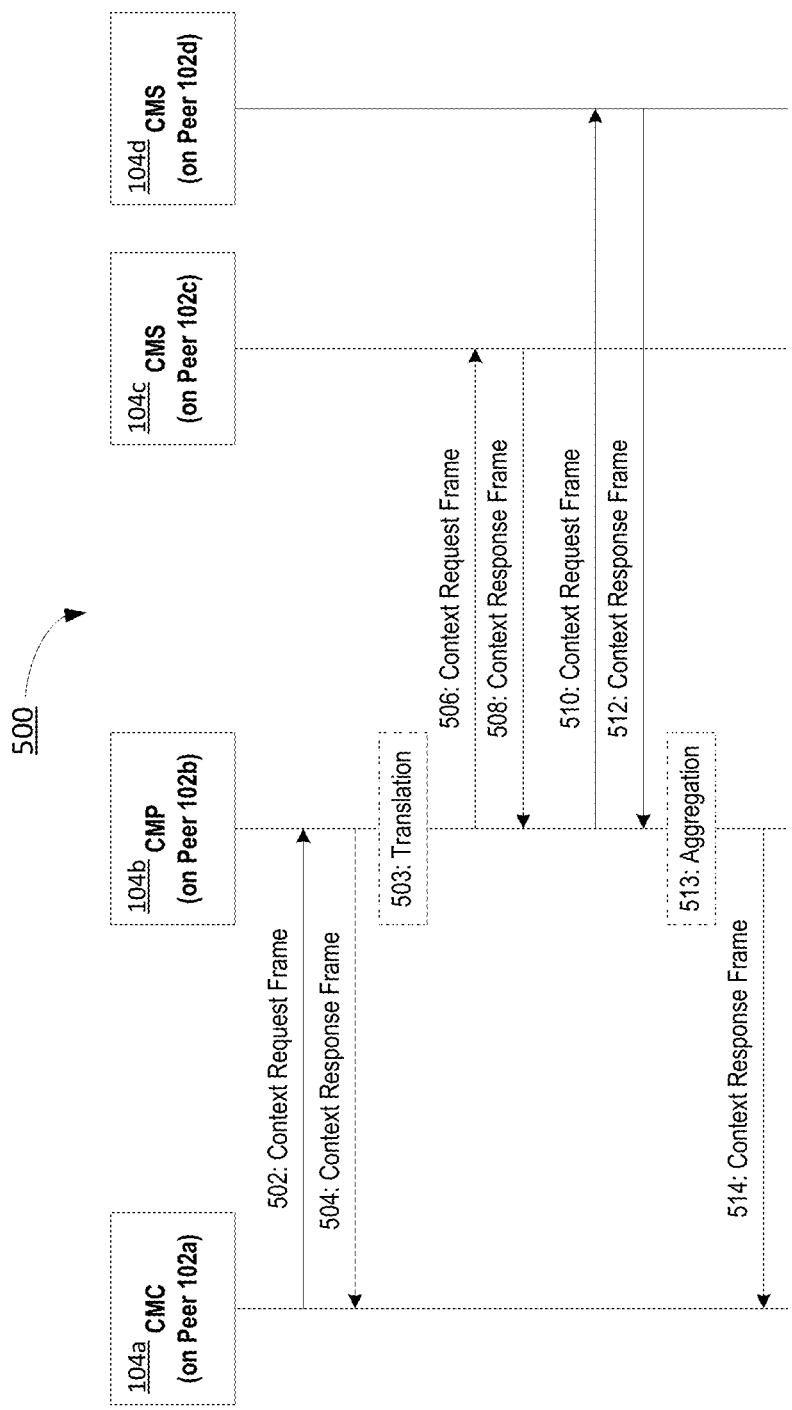
FIG. 5 illustrates a call flow for proxy-based context operations in accordance with an example embodiment.

FIG. 5 illustrates an example proxy-based context management system 500 that may include one or more peer devices 102 that communicate with each other via proximity communications. As illustrated, the system 500 includes the first CM 104a the first peer device 102a, the second CM 104b of the second peer device 102b, a third CM 104c of a third peer device 102c, and a fourth CM 104d of a fourth peer device 102d. In accordance with the illustrated embodiment, the first CM 104a performs as a context manager client (CMC) 104a, the second CM 104b performs as a context manager proxy (CMP) 104b, and third and fourth context managers 104c and 104d perform as context manger servers 104c and 104d, respectively. It will be appreciated that the example system 500 is simplified to facilitate description of the disclosed subject matter and is not intended to limit the scope of this disclosure. Other devices, systems, and configurations may be used to implement the embodiments disclosed herein in addition to, or instead of, a system such as the system 500, and all such embodiments are contemplated as within the scope of the present disclosure.

Still referring to FIG. 5, at 502, the first CM 104a of the first peer device 102a sends a context request frame to the second CM 104b of the second peer device 102b. Example context request frames are described above with reference to FIG. 2. At 504, the CM 104b looks up its local context database. In an example embodiment, if the CM 104b finds sufficient context information in the database to answer the context request from 502, the second CM 104b may send a context response frame to the first CM 104a, at 504. Example context response frames are described above with reference to FIG. 2. Alternatively, in accordance with the illustrated embodiment, at 503, the second CM 104b may translate the context request into a format in which another CM, for instance the third CMS 104c, understands. At 506, the second CM 104b sends a translated context request frame to the third CM 104c of the third peer device 102c. At 508, the third CM 104c sends a context response frame to the second CM 104b. At 510, the second CM 104b may send the context request frame to another CM, such as the fourth CM 104d of the fourth peer device 102d. At 512, the fourth CM 104d may send the context response frame to the CMP second CM 104b. At 513, the second CM 104b may aggregate the responses received from the third and fourth context managers 104c and 104d. While the illustrated CM 104b aggregates two response, it will be understood that any number of responses may be aggregated by a CM that functions as a CMP as desired. At 514, in accordance with the illustrated embodiment, the second CM 104b sends the aggregated responses in one or more context response frames to the first CM 104a, which performs as the CMC in accordance with the illustrated embodiment.

Figure 6:
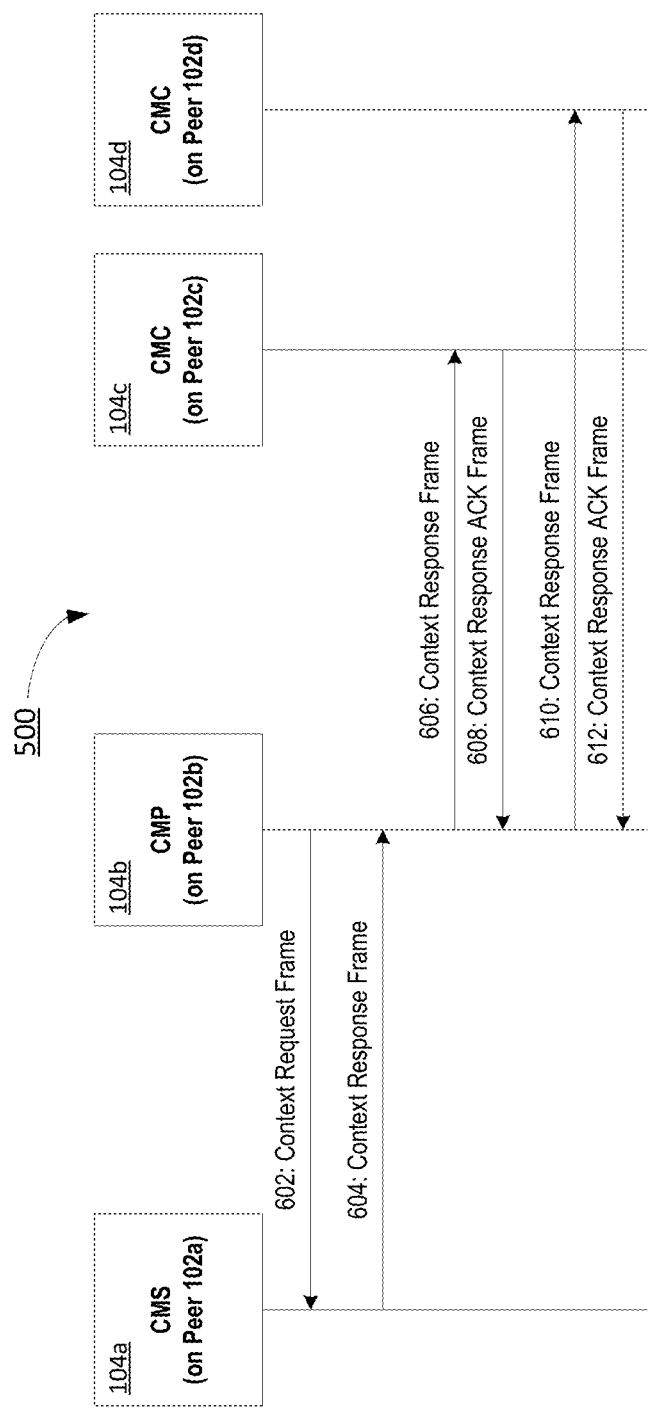
FIG. 6 illustrates another call flow for proxy-based context operations in accordance with another example embodiment.

FIG. 6 illustrates the system 500 depicted in FIG. 5, but FIG. 6 shows another example of proxy-based context operations in accordance with another example embodiment. Referring to FIG. 6, at 602, the second CM 104b, which functions as the CMP in accordance with the illustrated embodiment, sends a context request frame to the first CM 104a, which functions as the CMS in accordance with the illustrated embodiment. In some cases, before 602, the second CM 104b may receive requests from the third CM 104c of the third peer 102c and the fourth CM 104d of the fourth peer 104d, which triggers the second CM 104b to send the request at 602. In accordance with the illustrated example depicted in FIG. 6, the third CM 104c and the fourth CM 104d function as context manger clients. At 604, the first CM 104a sends a context response frame to the second CM 104b. At 606, the second CM 104b may analyze the received response. The second CM 104b may forward at least a portion, for instance all, of the context response frame to the third CM 104c, at 606. At 608, the third CM 104c sends a context response ACK to the second CM 104b. Example context response acknowledgements are described above with reference to FIG. 3. At step 610, the second CM 104b may forward at least a portion, for instance all, of the context response frame to the fourth CM 104d. The fourth CM 104 may receive the context response frame, and at 612, may send a context response ACK to the second CM 104b.

Figure 7:
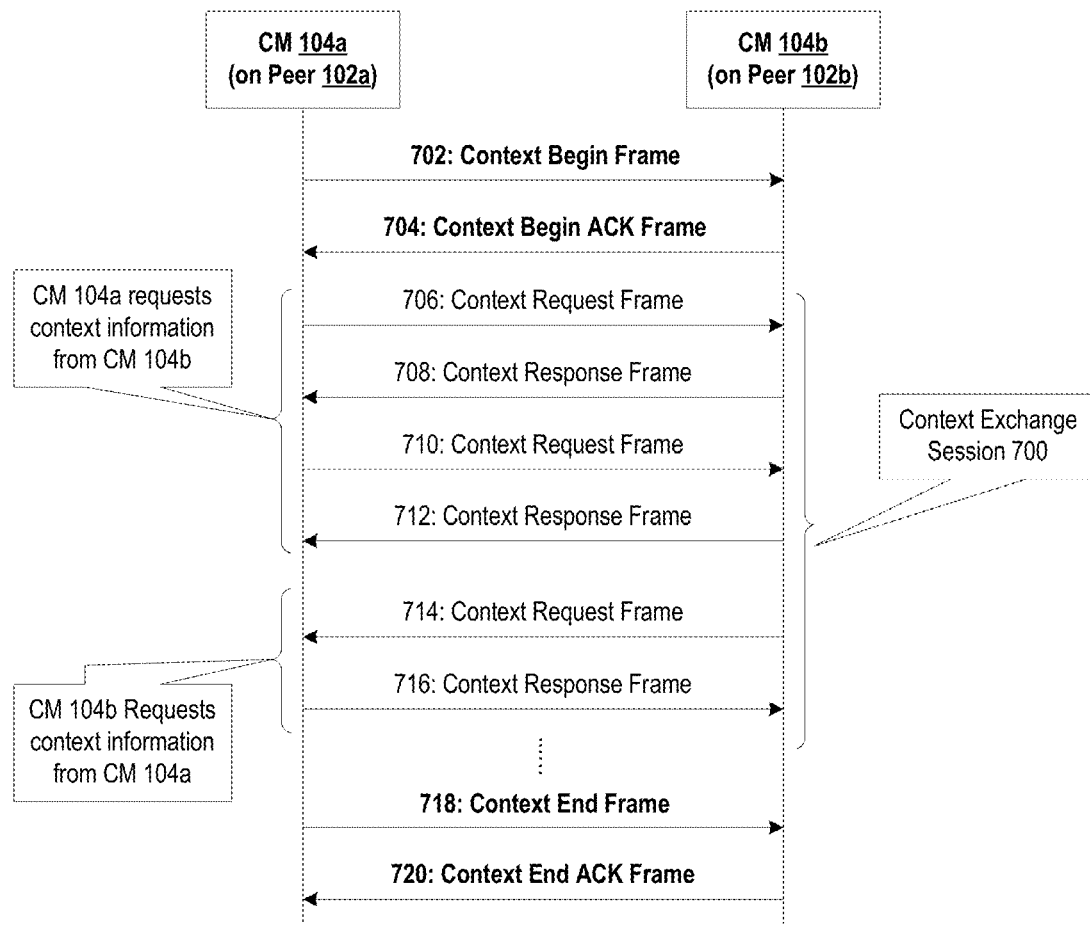
FIG. 7 illustrates a call flow for session-based context operations in accordance with an example embodiment.

Referring now to FIG. 7, an example of session-based context operations is illustrated, wherein the session-based context operations are performed by the first peer 102a and the second peer 102b, and in particular the first CM 104a and the second CM 104b. At 702, in accordance with the illustrated embodiment, the first CM 104a sends a context begin frame to the second CM 104b to request the beginning of a context exchange session 700. At 704, the second CM 104b sends a context begin ACK frame to the first CM 104a that approves the request for the context exchange session 700. Thus, the context exchange session 700 begins at 706. At step 706, the first CM 104a sends a context request frame, as described above, to the second CM 104b. At 708, the second CM 104b sends a context response frame to the first CM 104a. Steps 710 and 712 repeat steps 706 and 708, respectively. It will be understood that any number of context request frames and content response frames can be exchanged between the first and second CM 104a and 104b as desired. By way of example, at 710, the first CM 104a sends a second context request frame to the second CM 104b. At 712, the second CM 104b sends a second context response frame to the first CM 104a in response to the second context request frame. At step 714, the second CM 104b sends a context request frame to the first CM 104a. The second CM 104b can piggyback the context request at 714 when the second CM 104b sends the context response to the first CM 104a (at 712). Thus, the message at 712 may contain at least some, for instance all of the content of the message that is sent at 714. In an example embodiment, the second CM 104b can also send the context request before the first CM 104a finishes requesting context information from the second CM 104b. At 716, in accordance with the illustrated embodiment, the first CM 104a sends a context response frame to the second CM 104b. At 718, the first CM 104a sends a context end frame to the second CM 104b to request that the current context exchange session 700 be stopped. At 720, in accordance with the illustrated embodiment, second CM 104b sends a context end acknowledgement frame to the first CM 104a to acknowledge the context end frame requesting that the context exchange session 700 be stopped, thereby end the context exchange session 700.

Context information is widely used in peer aware communications (PAC) to form a P2PNW and to enable the communication within the P2PNW. However, context information is not specified in any existing IEEE 802.15 or 802.11 MAC frame. To enable the exchange of context information, as described herein, and to make MAC functionalities, such as context-aware discovery, context-aware association, context-aware synchronization, and context-aware power control, etc., more efficient, modification and/or extension to the current MAC frames may be implemented, and new Information Elements (IEs) may be defined, as disclosed hereinafter. Further, in an embodiment, the modified and extended frame formats and IEs described herein may be used to implement the context information request frames and context information response frames described above.

In an embodiment, a frame format may be used that may be a general MAC frame with new fields in the MAC header that are related to context information that facilitates context-aware discovery, association, power control, channel management and synchronization procedures. New beacon frames may also be used with new fields that define the superframe structure and the application frame. New management frames may be used to support association, disassociation, re-association, and association update requests and responses with new fields that define the properties of an association, and new fields that indicate the related context information. Another new management frame may be a power control request and response frame that includes new fields to carry information about context and power control. Yet another new management frame may be a common control/data channel (CCDCH) or a dedicated control/data channel (DCDCH) request and response frame that includes new fields to carry the allocation of channel resources in a superframe. A CCDCH is defined for inter-P2PNW communications and shared by SuperVL, VLs, SubVL(s) or peers of services or applications in proximity. By way of example, and without limitation, the CCDCH may be used for common control messages among P2PNWs in proximity; paging or broadcast messages to P2PNWs in proximity; or short high priority data that is broadcast to P2PNWs in proximity. A DCDCH is defined for intra-P2PNW communications and shared by the VL, SubVLs and peers within a P2PNW. By way of example, and without limitation, the DCDCH may be used for common control messages among VL, SubVLs, peers within a P2PNW; paging or broadcast messages to VL, SubVLs, or peers within a P2PNW; or short high priority data transmissions that are broadcast to VL, SubVLs, or peers within a P2PNW.

Also in an embodiment, new information elements (IE) may be used that include a context information IE that carries the context information for P2PNW management and communication and a context and power control information IE that carries the most important information for power control procedures. Further details about these frames and IEs is set forth herein.

Figures 8A, 8B:
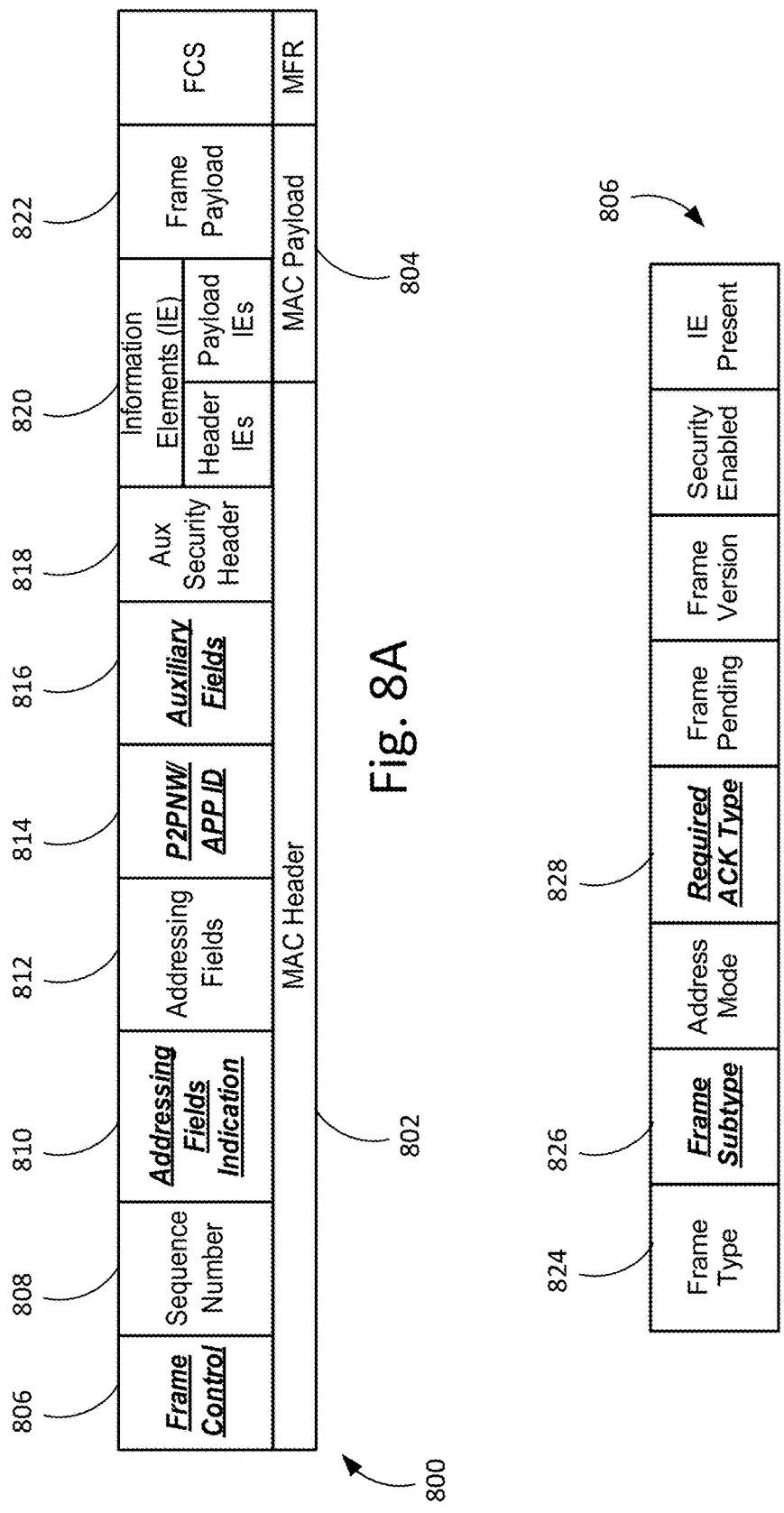
FIG. 8A illustrates an exemplary, non-limiting modified and/or extended general MAC frame format according to an embodiment.
FIG. 8B illustrates an exemplary, non-limiting frame control field format according to an embodiment.

FIG. 8A illustrates one embodiment of a modified MAC frame format 800 that may be used in connection with the context management procedures described herein. In FIGS. 8A-B, 9A-C, 10A-F, and 11A-D, fields indicated in bold, italic, and underline are new or modified fields and may include new sub-fields. Other fields may have the same meaning as defined in the existing IEEE 802.15.4 and 802.11 standards.

As shown, the frame 800 generally comprises a MAC header 802 and MAC payload 804. In one embodiment, all fields in the frame may be required except the auxiliary fields 816 and auxiliary security header 818. In an embodiment, the sequence number field 808 and auxiliary security header 818 may have the same meaning as defined in the IEEE 802.15.4 standard.

In this embodiment, the frame control field 806 carries control information, such as the frame type, required type of acknowledgement message, and addressing mode. FIG. 11B illustrates one embodiment of a format 500 of the frame control field. In an embodiment, the frame type, frame pending, frame version, security enabled, and IE present fields may have the same meaning as defined in the IEEE 802.15.4 standard. In one embodiment, all the fields in this frame control fields 806 may be mandatory.

Frame type and subtype fields 824, 826 may be mandatory and together may indicate the type of a frame, i.e., the function of a frame. In one embodiment, there are four basic frame types: beacon, management, data, and acknowledgement. Each type of frame may have several subtypes. In addition, the meaning of subtype fields may vary for different frame types. Tables 1, 2, 3, and 4 below specify combinations of frame type and subtype that may be used in one embodiment. In these tables, the numeric value is given, but not at the bit-wise level. Other values for each subtype may be used. Further details of each frame type are provided below.

TABLE 1

Type and Subtype Combinations for a Beacon Frame

| Frame Type Value | Frame Type | Beacon Subtype | For Discovery | Frame Subtype | Frame Subtype Description |
|---|---|---|---|---|---|
| 0 | Beacon | 0 | 0 or 1 | Super beacon under centralized control (SuperVL) | Defines a superframe and an application frame. Sender wants to be discovered if 'for discovery' is 1; otherwise it does not want to be discovered. Note: the 'for discovery' information in subtype field may apply to all types of beacon. |
|  |  | 1 | 0 or 1 | Application beacon under centralized or hybrid control (VL) | Defines an application frame. |
|  |  | 2 | 0 or 1 | Common application beacon under hybrid control (VL) | Defines a super frame and an application frame |
|  |  | 3 | 0 or 1 | Peer beacon under distributed control | Carry context information for discovery |
|  |  | 4 | 0 or 1 | Common peer beacon under distributed control | Defines a super frame and an application frame |
|  |  | 5 | 0 or 1 | Dedicate peer beacon under distributed control | Defines an application frame if application frame is used in the distributed mode |

TABLE 2

Type and Subtype Combinations for Management Frame

| Frame Type Value | Frame Type | Frame Subtype Value | Frame Subtype |
|---|---|---|---|
| 1 | Management | 0 | Association request |
|  |  | 1 | Association response |
|  |  | 2 | Re-association request |
|  |  | 3 | Re-association response |
|  |  | 4 | Disassociation request |
|  |  | 5 | Disassociation response |
|  |  | 6 | Association update notification |
|  |  | 7 | Association update response |
|  |  | 8 | Power control request |
|  |  | 9 | Power control response |
|  |  | 10 | Synchronization request |
|  |  | 11 | Synchronization response |
|  |  | 12 | Inter-P2PNWs channel allocation Channel allocation request |
|  |  | 13 | Inter-P2PNWs channel allocation Channel allocation response |
|  |  | 14 | Intra-P2PNWs channel allocation Channel allocation request |
|  |  | 15 | Intra-P2PNWs channel allocation Channel allocation response |

TABLE 3

Type and Subtype Combinations for Data Frame

| Frame Type Value | Frame Type | Frame Subtype Value | Frame Subtype |
|---|---|---|---|
| 2 | Data | 0 | Data |
| | | 1 | Data + ACK |
| | | 2 | Dummy data |
| | | 3 | Data + QoS requirement |

TABLE 4

Type and Subtype Combinations for ACK Frame

| Frame Type Value | Frame Type | Frame Subtype Value | Frame Subtype |
|---|---|---|---|
| 3 | ACK | 0 | Individual ACK |
| | | 1 | Aggregated ACK |
| | | 2 | Conditional ACK |
| | | 3 | Group ACK |
| | | 4 | Cross-layer ACK |
| | | 5 | Cross-application ACK |
| | | 6 | Cross-layer and Cross-application ACK |
| | | 7 | Fragment incremental ACK (IACK) |

Referring still to FIG. 8B, in an embodiment, a required ACK type field 828 in the frame control field 806 may specify what type of acknowledge frame is expected. For example, the required ACK type field may be set as shown in Table 5 below.

TABLE 5

Values of the Required ACK Type Field 828

| Required ACK Type Value | Type of ACK Required |
|---|---|
| 0 | No ACK |
| 1 | Individual ACK |
| 2 | Aggregated ACK |
| 3 | Conditional ACK |
| 4 | Group ACK |
| 5 | Cross-layer ACK |
| 6 | Cross-application ACK |
| 7 | Cross-layer and Cross-application ACK |
| 8 | Fragment incremental ACK (IACK) |

Referring back to FIG. 8A, addressing fields may consist of one or more of a source address, a destination address, a transmitting hop address, and a receiving hop address. Source address and destination address fields may carry the source and destination address of a frame. Transmitting hop address and receiving hop address fields may be reserved for multi-hop scenarios, carrying the address information of the intermediate peers. A transmitting hop address is an address of the peer sending this frame. The receiving hop address is the address of the peer to receive this frame. The presence of a transmitting hop address and/or a receiving hop address field may be indicated by the addressing fields indication.

As shown in FIG. 8A, the MAC frame format 800 may further include an addressing fields indication field 810 that may contain an indication of the presence of a transmitting hop address and a receiving hop address in the addressing fields 812. While a source and destination address may always be present in addressing fields 812, the presence of a transmitting hop address and a receiving hop address may be optional for a multi-hop scenario. For example, for one-hop transmission, neither is present, for the first hop in a multi-hop transmission (i.e., the original source is sending the frame) only a receiving hop address is present and the transmitting hop address is the same as the source address, for the last hop in a multi-hop transmission only a transmitting hop address is present and the receiving hop address is the same as the destination address, and for other hops in a multi-hop transmission, both a transmitting hop address and a receiving hop address are included. In addition, a frame may be a relayed frame when the addressing fields indication is set up as in the last two examples (last hop and other hops).

As further shown in FIG. 8A, a P2PNW/APP ID field 814 field may contain a P2P network ID or application ID. All peers joining a P2P network (NW) may have a locally unique P2PNW/APP ID. If a P2PNW ID is not determined when a frame is sent, this field may carry an application ID. Because a P2PNW may be formed by an application or service, a P2PNW ID may be a network identifier that may be used to define and differentiate an application-specific P2PNW. Due to the distributed nature of proximity services, a P2PNW ID may be locally unique.

A P2PNW ID may include but is not limited to, a CAID or application ID that indicates the desired service or application (e.g., Facebook for social networking, Netflix for video streaming, etc.), location information indicating the location of the P2PNW, an ID of the peer that generated the P2PNW ID, and a network sequence number that may be used to differentiate existing P2PNWs with the same context information. A P2PNW ID may be generated using different structures, such as a concatenated structure where each piece of information is assigned with some information bits and all information pieces are concatenated or a parallel structure where all pieces of information are added together through some mathematical calculation, such as XOR and hash.

Based on different control schemes, a P2PNW ID may be generated and assigned by different parties in the network. In a centralized control scheme embodiment, a P2PNW ID may be generated by a SuperVL that then notifies the VL(s), or a VL may generate the P2PNW ID and broadcast it in a beacon to notify the SuperVL and other VLs. In a hybrid control scheme embodiment, a VL may generate a P2PNW ID and broadcasts it in a beacon to notify other VLs. In a distributed control scheme embodiment, a peer that wants to form a P2PNW (i.e., a peer that defines a new application frame) may generates a P2PNW ID and broadcast a beacon to notify every peer within the proximity of the P2PNW ID.

Still referring to FIG. 8A, an Auxiliary Fields field 816 may contain fields that are optional but important for some functionalities. For example, a context category field may be included that indicates an application or service category, such as emergency service, social networking, smart office, etc. As another example, a hopper indication field may be included that indicates whether a frame sender is willing to relay other frames for a multi-hop discovery process.

FIG. 9A illustrates an exemplary beacon frame format 830. A beacon frame may play an important role in forming a P2PNW and enabling P2P communication. It may be used to carry context information for a discovery procedure, to define a new superframe and/or application frame through a channel management process, to determine the frame/slot boundary for synchronization, and to facilitate power control procedures.

The beacon frame may be used for discovery and may carry context information as well as P2PNW information. The subtype field for a beacon frame may be split into two parts as shown in Table 1. The beacon subtype may define the specific beacon frame type, and the "for discovery" bit may be set to '1' if the beacon holder wants to be discovered by providing context information required for discovery. This bit may be set to '0' if the beacon holder does not want to be discovered. Some beacons define both a superframe and an application frame while some only define an application frame.

Table 1 above defines valid combinations of the frame type and subtype fields of the Frame Control field for the beacon frame 830. Each type of beacon frame may be uniquely mapped to a control scheme and the role of the beacon sender (i.e., SuperVL/VL/peer). A beacon frame does not require any ACK. If a beacon message carries one or more IEs, the IE present field may be set as true and otherwise set as false. Depending on whether the beacon is relayed or not, the addressing fields indication (not shown) and addressing fields 832 are configured correspondingly. A P2PNW ID field 834 may be carried in the beacon. A context category field 836 may be included to provide context for discovery and/or synchronization procedures. If the beacon is sent for discovery, a hopper indication field 838 should be present.

Regarding the beacon payload, and still referring to FIG. 9A, a frame information field 840 may be a part of the beacon payload, and may consist of two components, superframe information and application frame information. As seen in Table 1, a super beacon may carry both superframe information and application frame information. An application beacon under centralized or hybrid control may carry only application frame information. A common application beacon under hybrid control may contain both superframe information and application frame information. A peer beacon under distributed control may carry context information for discovery. A common peer beacon under distributed control may contain both superframe information and application frame information. Finally, a dedicated peer beacon under distributed control may carry only application frame information.

FIG. 9B shows an example format for superframe information 840a that may be provided in the frame information field 840 of a beacon. The beacon carrying the superframe information may also define the start of a new superframe. As shown in FIG. 9B, a superframe length may always be equal to the beacon interval, and therefore there is no beacon interval field in the superframe information. The number of CCDCH slots 842 may indicate the number of time slots that are provided by CCDCH, which follows the beacon frame. The CCDCH slot size 844 may define the slot size of each CCDCH slot. The application frame list 846 may contain a list of items for describing applications frames contained in current superframe, each of which has been granted with a period of time in the superframe. Each item in the application frame list may describe a different application frame and consist of the application information and the application frame offset. An application frame offset may indicate the time offset between the start point of the application frame and a certain time reference, such as the start point of the superframe. This field may be used for synchronization purposes.

FIG. 9C illustrates an example format for application frame information 840b that may be provided in the frame information field 840 of a beacon. The application frame length 848 may indicate a total length of the new application frame. The number of DCDCH slots 850 may indicate the number of time slots that are included in DCDCH, which follows the beacon frame. The DCDCH and CFP may have the same slot size, which is defined in slot size field. The super/common beacon offset field 852 may indicate where the super beacon or common beacon is located in the superframe in terms of the time offset. This field may be used for synchronization purposes.

Referring again to the beacon frame format 830 of FIG. 9A, the other beacon payload field may contain information from one or more higher layers.

Association related procedures may play an important role in forming and updating P2PNWs. Various frame formats designed for the association, disassociation, re-association, and association update procedure, are contemplated herein. FIG. 10A illustrates a format of an association request frame 860, where all the listed fields in the MAC payload portion may be mandatory. Frame type and subtype may be configured as shown in Table 2 to indicate this is an association request frame. A long address or full address may be used in an association request frame. An association request frame does not require any ACK. Instead, an association response may be required as a reply to the association request. If the association request message carries one or more IEs, the IE present field should be set as true and otherwise set as false. Depending on whether the association request is relayed or not, the addressing fields indication and addressing fields (not shown) are configured accordingly, as described herein. A P2PNW ID may be carried in the association request.

Regarding the MAC payload of the association request frame 860, device capability 862 may be the different types of capability of the peer that is sending the request. For example, this field may contain one or more indicators of the sending peer's transmission data rate capability, battery/power consumption capability, and/or security capability. In IEEE 802.15.8, a P2PNW is formed by a desired application. The association may be classified as a device-based, service-based, and/or user-based association. A peer may maintain multiple applications, and therefore may maintain multiple different types of association connections. The association type field 864 may indicate the type of association that is expected to be established. According to the specific application, a service-based or user-based association may be established, while a device-based association may be more commonly used in a multi-hop scenario.

The required duration field 866 of association request frame 860 may be set by the requestor to indicate a length of time that the association connection is expected to be active. The VL indication field 868 may indicate whether the sender of the request is a VL or not. The response type field 870 may be used to indicate the optional fields that may be required in the other MAC payload field as part of the corresponding association response message. The multi-hop indication field 872 may indicate whether the association request is relayed for a peer outside one-hop range of a receiver (i.e., multi-hop association). In the other MAC payload portion of association request frame 860, optional fields may be included, examples of which are shown below in Table 6.

TABLE 6

Examples of Optional MAC Payload Fields in Association Request

| Field Name | Description |
| --- | --- |
| Multi-hop peer ID | ID of the peer for which the association request is sent in multi-hop association scenario. ID could be device/service/user ID. |
| Number of associated peers | the number of peers that are associated with the requestor for the same application/service |
| Channel ID | indicate a new channel if the requestor wants to switch to for data communication after establishing the association |
| Willing to be VL | indicate if the requestor is willing to act as VL or not |
| Duty cycle indication | indicate if the association response frame needs to indicate the duty cycle for the association connection |
| Requested applications/services | a list of applications/services that the requestor is requesting. For example, a peer as a requester may indicate a list of applications (e.g., social networking, gaming), which it requests to be associate with another peer |
| QoS type | the class of QoS requirement, e.g., best effort, video or audio |
| QoS requirement | based on the QoS type, indicate the QoS requirement, e.g., 10 Mbps or latency is shorter than 5 ms. |
| Random number | used as password or encryption key for security purpose |
| Location of Requestor | Used to indicate the location of the requestor |
| Mobility of Requestor | Used to describe the mobility parameters of the requestor |

FIG. 10B illustrate exemplary association response frame 880. In the header of frame 880, frame type and subtype may be configured as shown in Table 2 to indicate this is an association response frame. The long address or full address may be used in association response frame 880. An association response frame does not require any ACK. If the association response message carries one or more IEs, the IE present field may be set as true, and otherwise set as false. Depending on whether the association response is relayed or not, the addressing fields indication and addressing fields of the header of frame 880 may be configured accordingly. A P2PNW ID may be carried in the association response. Neither a context category nor a hopper indication field may be used in an association response message.

Regarding the MAC payload of association response frame 880, a responder's device capability 882, association type 884, VL indication 892, and multi-hop indication 894 fields may have the same usage as that described herein for an association request message (see, e.g., FIG. 10A and associated text). The association ID 888 may be an identifier that identifies an association between two peers. In an embodiment, an association ID may be generated similarly to the generation of a P2PNW ID. The association decision field 886 may indicate whether the association request is accepted or not. Note that "accept" in this context may mean that all parameters in the association request are accepted.

The assigned duration field 890 may indicate the lifetime of the association to be established. The responder may make the lifetime determination based on the required duration in the association request. This may be a different value than the required duration of an association request. The assigned short address may contain the short address if a short address required field is set to true in the request message. Based on the response type field in an association request, the association response may include the required information specified in the other MAC payload portion of the request. In addition to the fields shown in Table 6, additional or alternative fields may be included in the response message, examples of which are illustrated below in Table 7.

TABLE 7

Examples of Optional MAC Payload Fields in Association Response

| Field Name | Description |
| --- | --- |
| Reject reason | Indicate the rejection reason if request is rejected |
| Association update interval | Indicate how often the two sides of association should update the association connection |
| Assigned role in application | Indicate the role of the requestor in the application. This is an application dependent parameter |
| Duty cycle | Indicate the duty cycle for the association to establish |
| Channel Access Parameters such as back-off timer | Indicate the channel access parameter, such as back-off timer and contention window size |
| Discovery Mode | Indicate a set of discovery parameters that may be used in the future, such as scan sequence and scan period |

A re-association request frame may have a structure that is very similar to the structure of an association request as described herein. The primary difference between the two structures may be that a re-association request may contain the mandatory association ID field in the MAC payload.

FIG. 10C illustrates an exemplary disassociation request frame 900. In frame 900, the multi-hop indication 908, number of associated peers 910, and multi-hop peer ID 912 fields may be the same as that in an association request frame (see, e.g., FIG. 10A and associated text). A disassociation request message may be sent to notify the other side of the association that the association will be terminated soon. The required ACK type in the frame control field of the header may indicate whether the disassociation response message is required or not. The disassociation reason field 904 may indicate why the association is going to be shut down. In an embodiment, the possible reasons may include link failure, application termination, and resource limitation. The disassociation duration field 906 may indicate the time duration of the disassociation. This may be used to temporarily suspend or terminate an association by indicating that after the time duration, the association will be active.

Figure 10D:
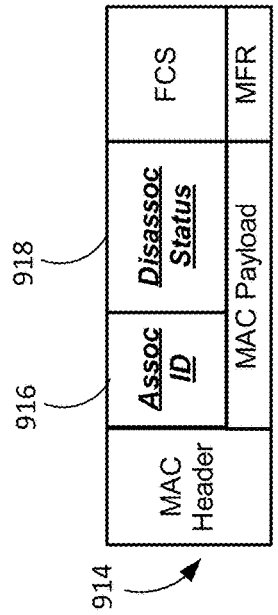
FIG. 10D illustrates an exemplary, non-limiting disassociation response frame format according to an embodiment.

FIG. 10D illustrates exemplary disassociation response frame 914 that may be used to confirm that the association is disconnected after receiving a disassociation request. In some cases, the peer receiving the disassociation request message does not need to send a disassociation response. This may depend on the configuration of required ACK type in the frame control field of the header. The disassociation status field 918 of frame 914 may indicate that the association is disconnected permanently. Alternatively, the disassociation status field 918 may indicate that the association is disconnected temporarily for a time period, which further indicates the association will be activated upon expiration of the time period.

Figure 10E:
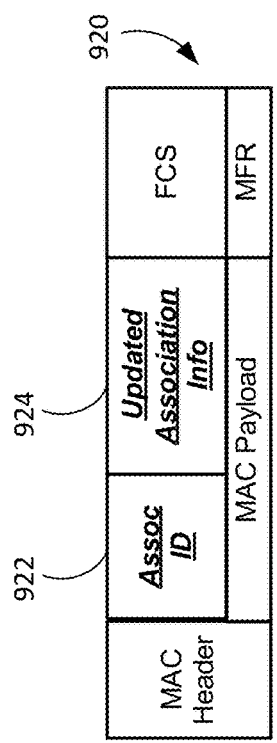
FIG. 10E illustrates an exemplary, non-limiting association update notification frame format according to an embodiment.

FIG. 10E illustrates an exemplary association update notification frame 920 that may be used to notify the other side that one or more attributes of an existing association should be or are being updates. In this frame, the updated association information field 924 may include one or more information fields with information about an existing association that needs to update. Any fields, mandatory or optional, in an association request frame and a response frame may be included in the updated association information field.

Figure 10F:
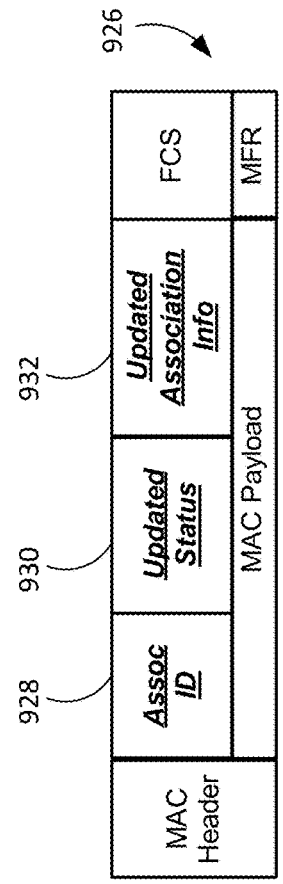
FIG. 10F illustrates an exemplary, non-limiting association update response frame format according to an embodiment.

FIG. 10F illustrates an exemplary association update response frame 926 that may be used to confirm the update of an association attribute noted by an association update notification frame. The updated status field 930 of this frame indicates whether all of the requested updated association information is updated. The contents of this field may indicate that such information is fully updated, partially updated, or all rejected. The updated association information field 932 may include one or both of two pieces of association information, the request updated association information in the association update notification frame that has not been updated and the association information that is required to be updated by the sender of the association update response.

Channel management defines the superframe structure and channel access in proximity. A superframe may consist of CCDCH and one or more application frames, each of which may be further split to DCDCH and a contention free period. Channel management frames may be classified as a CCDCH request, CCDCH response, DCDCH request, and DCDCH response frame, as shown in Table 2. All these frames may be used to contend for and allocate the channel resource.

Figure 11A:
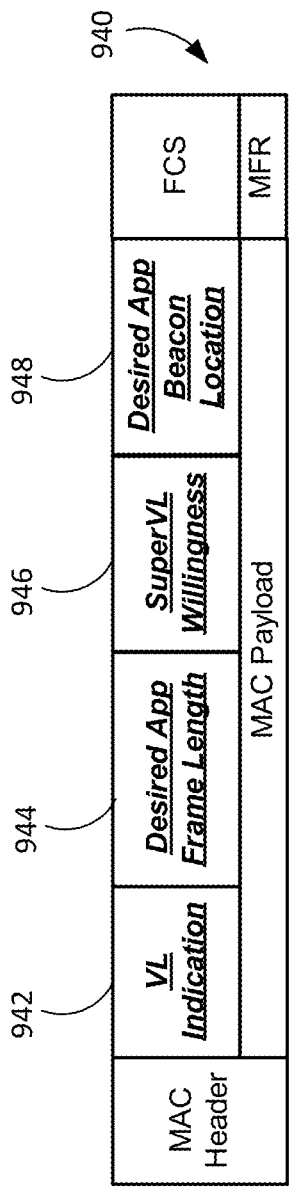
FIG. 11A illustrates an exemplary, non-limiting inter-P2PNW channel allocation request frame format according to an embodiment.
Figure 11B:
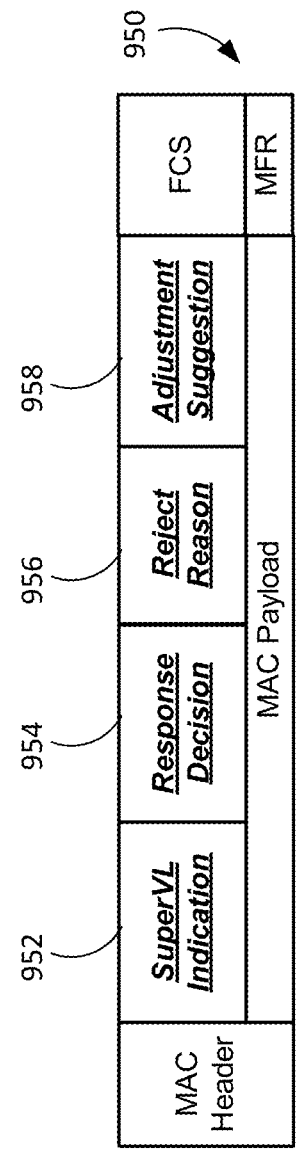
FIG. 11B illustrates an exemplary, non-limiting inter-P2PNW channel allocation response frame format according to an embodiment.

FIG. 11A illustrates exemplary inter-P2PNW channel allocation request frame 940 that may be used to broadcast a request on the CCDCH in the proximity for radio resource allocation. The VL indication field 942 of this frame may indicate whether the sender is a VL or not. In distributed control scheme embodiments, this field is always false. The desired application frame length field 944 may indicate the desired time duration of the application frame that the sender is attempting to construct. The SuperVL willingness field 946 may indicate whether the sender is willing to act as a SuperVL. This field may be mandatory. The desired application beacon location field 948 may be an optional field that indicates when the application beacon is broadcast. This field may be present only when the sender has knowledge of the superframe structure and already synchronizes with the P2PNW.

FIG. 11B illustrates exemplary inter-P2PNW channel allocation response frame 950 that may be sent after an inter-P2PNWs channel allocation request frame 940 on CCDCH. The SuperVL indication field 952 in this frame may indicate whether the response is sent from a SuperVL or not. In hybrid and distributed control scheme embodiments, this field may always be false. The response decision field 954 may indicate whether the corresponding inter-P2PNWs channel allocation request is accepted or not. The reject reason field 956 may be used to indicate the reason why a request is rejected. For example, the requested time period may totally or partially overlap with a time period that has been allocated to an application frame. The adjustment suggestion field 958 may be an optional field that may include a suggestion of an available time period. The adjustment suggestion may be given higher priority if the response is from the SuperVL.

Figure 11C:
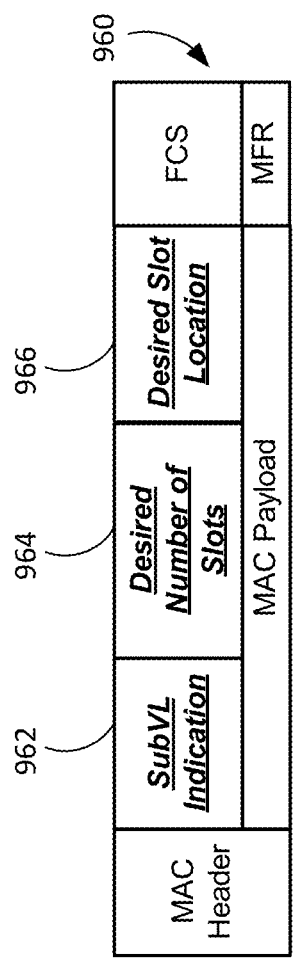
FIG. 11C illustrates an exemplary, non-limiting intra-P2PNW channel allocation request frame format according to an embodiment.

FIG. 11C illustrates an exemplary intra-P2PNW channel allocation request frame 960 that may be sent over DCDCH and used to request one or more time slots in an application frame. In an embodiment, a sender of frame 960 may know the application frame specification when broadcasting the intra-P2PNWs channel allocation request. The SubVL indication field 962 may indicate that the requestor is the SubVL or a peer. In a distributed control scheme embodiment, this field is always setup as a peer. The desired number of slots field 964 may indicate how many time slots the sender requests. The slot size may be fixed during the whole application frame and a peer may only be permitted to request a number of slots for transmission. The desired slot location field 966 may be an optional field that indicates the position of the desired time slots in the application frame.

Figure 11D:
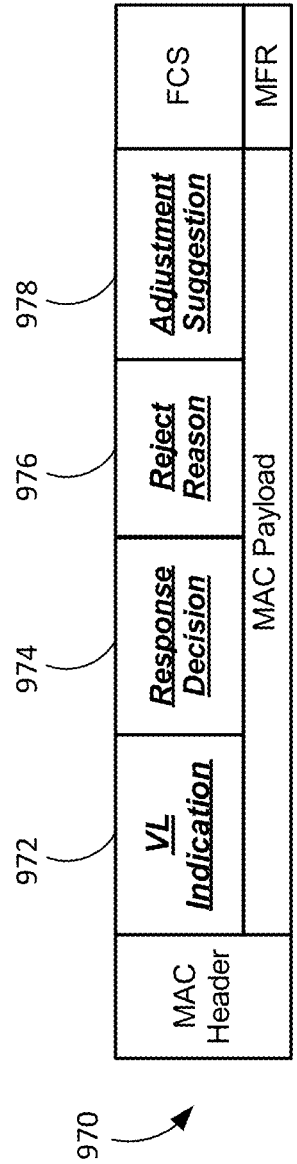
FIG. 11D illustrates an exemplary, non-limiting intra-P2PNW channel allocation response frame format according to an embodiment.

FIG. 11D illustrates exemplary intra-P2PNW channel allocation response message 970 that may be sent as a reply to an intra-P2PNW channel allocation request. The VL indication field 972 of this frame indicates whether the response message is sent by a VL or not. In a distributed control scheme embodiment, this field is always false. The response decision 974, reject reason 974, and adjustment suggestion 978 fields may have the same usage as those fields are used in an inter-P2PNW channel allocation response frame (see, e.g., FIG. 11B and related text).

As mentioned above, power control request frames (e.g., Frame Type=1; Frame Subtype=8) may be used to request context and power control information within proximity. Table 8 lists some exemplary additional fields that may be provided in the MAC payload (e.g., the Frame Payload field 822 of the MAC Payload 804 of frame format 800) of a power control request frame, in accordance with one embodiment. In one embodiment, the information in Table 8 may be exchanged only once within proximity. Only when any of this information is changed will it be included in a power control request for information exchange. Other power control related information, such as service power category, transmission power, and received signal quality, may be included in one or more CPCI IEs, as further described below.

TABLE 8

Fields in an example Power Control Request Frame

| Field | Description | Mandatory/Option |
|---|---|---|
| Power control interval | Indicate how frequent the sender will start a power control procedure in for the application with the service power category shown in CPCI IE | M |

TABLE 8-continued

Fields in an example Power Control Request Frame

| Field | Description | Mandatory/Option |
|---|---|---|
| Maximum tx power | Upper limit of power level that could be used by the sender. | M |
| Minimum tx power | Lower limit of power level that could be used by the sender. | M |
| Service range | Indicate the typical service radio range for a ProS P2PNW. The service range can vary greatly with different proximity services. For example, the service range for public safety proximity service will be significant larger than the service range of a smart home proximity service. | O |
| Bandwidth | Indicate the bandwidth or subcarriers allocated for the sender in a ProS P2PNW | O |

In an embodiment, a power control response may be sent when a peer receives a power control request message. As described above, a power control response message may provide the power control information of the peer receiving the power control request to the requestor. The information included in a power control response message is similar to the information provided in a power control request.

An Information Element (IE) may provide a flexible, extensible, and easily implementable way to encapsulate information for efficient message exchange. An IE may be either part of a MAC header or a MAC payload. In the example frame format 800 illustrated in FIG. 8A, a field 820 is provided for holding IEs. Multiple IEs may be concatenated in one frame.

In an embodiment, a context information IE may carry the context information of a peer that is sending a frame. Since a P2PNW may be organized and managed based on the context information, a context information IE may be of higher importance and may be treated as a header IE in the MAC header. An example of a context information IE, in accordance with one embodiment, is provided below in Table 9.

TABLE 9

Fields in a Context Information IE

| Field | Description | Mandatory/Option |
|---|---|---|
| IE identifier | Identify the type of IE | M |
| IE length | Indicate the total length of the IE | M |
| Context category | i Context category indicates the application/service category, such as emergency service, social networking, smart office, etc. | O |
| App ID/Device ID/User ID | indicate the identifier of context according to the type of applications, such as service-based, device-based or user-based | O |
| App/Device/User parameters | Indicate more specific context information. For example, the price and discount information for advertisement service; game skill level information for a game | O |

Table 10 below lists example fields of an IE for carrying CPCI in a power control request or response frame.

TABLE 10

Fields in CPCI IE

| Field | Description | Mandatory/Option |
|---|---|---|
| IE identifier | Identify the type of IE | M |
| IE length | Indicate the total length of the IE | M |
| Tx power | Indicates the transmission power that is used to send the message | M |
| Service power category | Indicate the sender's power control classification according to the power control requirements for different types of proximity services or applications, such as public safety, social networking, commercial advertisement, sensor network, smart office, etc. | M |
| Rx signal quality or path loss | indicates the received signal quality, e.g., RSSI or the estimated path loss based on the previous transmission between transmitter and receiver | O |
| Power adjustment | Carry the recommendation for the expected receiver on how to adjust the transmission power to make the transmission more reliable | O |

In other embodiments, context information and CPCI information may be carried in an 802.15 or 802.11 beacon frame, having new or modified fields similar to those illustrated in FIG. 8A.

Figure 12A:
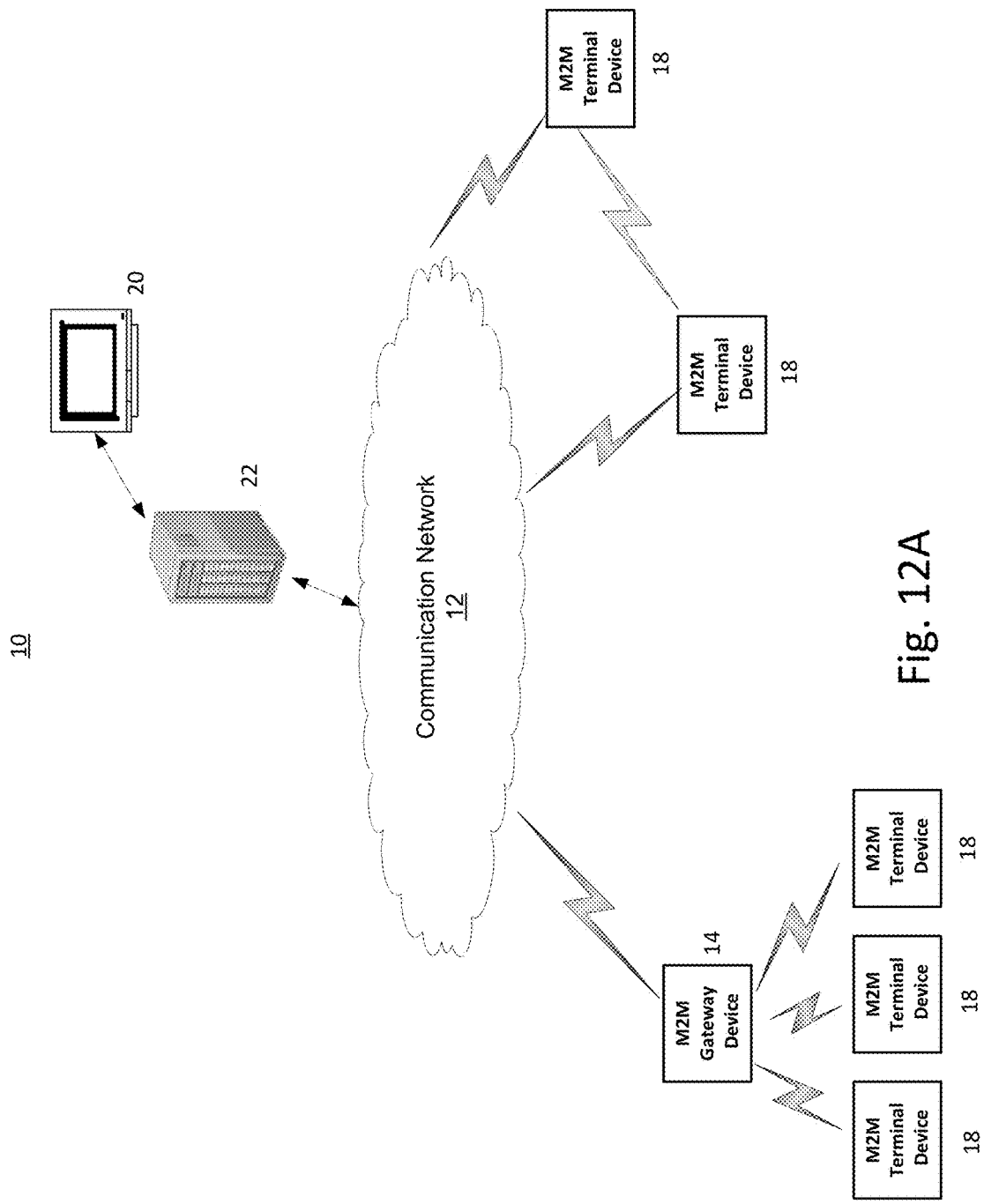
FIG. 12A is a system diagram of an example machine-to-machine (M2M) or Internet of Things (IoT) communication system in which one or more disclosed embodiments may be implemented.

FIG. 12A is a diagram of an example machine-to machine (M2M), Internet of Things (IoT), or Web of Things (WoT) communication system 10 in which one or more disclosed embodiments may be implemented. For example, the context managers described with reference to FIGS. 1-7 may reside on various devices depicted in FIG. 12A, as described further below. Generally, M2M technologies provide building blocks for the IoT/WoT, and any M2M device, gateway or service platform may be a component of the IoT/WoT as well as an IoT/WoT service layer, etc.

As shown in FIG. 12A, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may comprise multiple access networks that provide content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 12A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain includes M2M gateways 14 and terminal devices 18. It will be appreciated that any number of M2M gateway devices 14 and M2M terminal devices 18 may be included in the M2M/IoT/WoT communication system 10 as desired. The gateway devices 14 or the terminal devices 18 may be configured as peer devices in a system that performs context information management in accordance with the embodiments described above. The gateway devices 14 and/or the terminal devices 18 may be configured as the peer devices 102, and thus each of the gateway devices 14 and the terminal devices 18 may include the context manager 104. Further, each of the gateway devices 14 and the terminal devices 18 may include a context manager proxy, such as the CMP 202 for example. Each of the M2M gateway devices 14 and M2M terminal devices 18 are configured to transmit and receive signals via the communication network 12 or direct radio link. The M2M gateway device 14 allows wireless M2M devices (e.g., cellular and non-cellular) as well as fixed network M2M devices (e.g., PLC) to communicate either through operator networks, such as the communication network 12 or direct radio link. For example, the M2M devices 18 may collect data and send the data, via the communication network 12 or direct radio link, to an M2M application 20 or M2M devices 18. The M2M devices 18 may also receive data from the M2M application 20 or an M2M device 18. Further, data and signals may be sent to and received from the M2M application 20 via an M2M service layer 22, as described below. M2M devices 18 and gateways 14 may communicate via various networks including, cellular, WLAN, WPAN (e.g., Zigbee, 6LoWPAN, Bluetooth), direct radio link, and wireline for example. The terminal devices 18 and the gateway devices 14 may communicate via various networks to exchange context management messages, as described above. For example, peer-to-peer communications described above can occur directly between multiple terminal devices 18, directly between multiple gateway devices 14, or directly between terminal devices 18 and gateway devices 14.

Figure 12B:
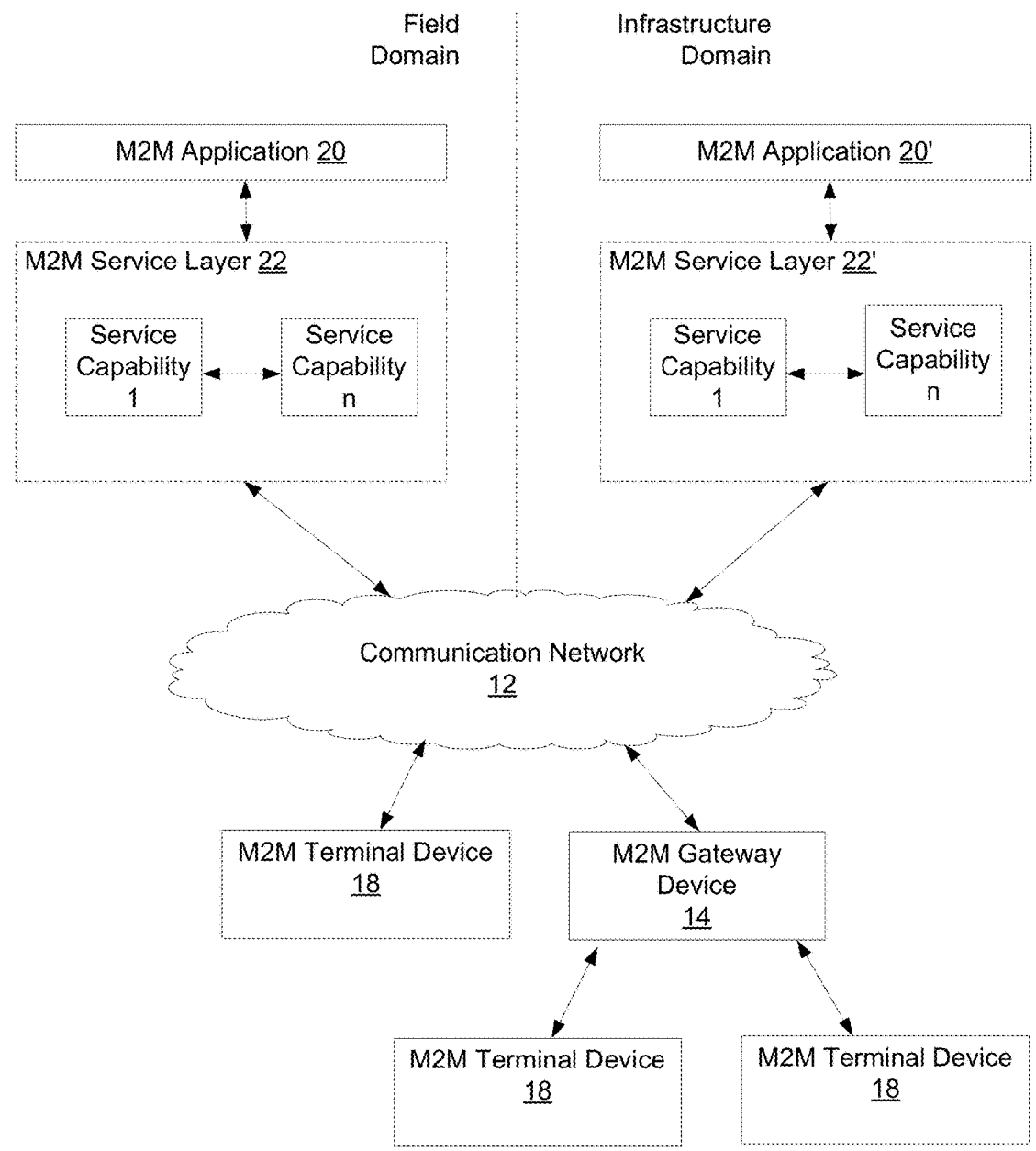
FIG. 12B is a system diagram of an example architecture that may be used within the M2M/IoT communications system illustrated in FIG. 12A.

Referring also to FIG. 12B, the illustrated M2M service layer 22 in the field domain provides services for the M2M application 20, M2M gateway devices 14, M2M terminal devices 18 and the communication network 12. It will be understood that the M2M service platform 22 may communicate with any number of M2M applications, M2M gateway devices 14, M2M terminal devices 18, and communication networks 12 as desired. The M2M service layer 22 may be implemented by one or more servers, computers, or the like. The M2M service 22 layer provides service capabilities that apply to the M2M terminal devices 18, the M2M gateway devices 14, and the M2M applications 20. The functions of the M2M service layer 22 may be implemented in a variety of ways, for example as a web server, in the cellular core network, in the cloud, etc.

Similar to the illustrated M2M service layer 22, an M2M service layer 22' resides in the infrastructure domain. The M2M service layer 22' provides services for an M2M application 20' and an underlying communication network 12' in the infrastructure domain. The M2M service layer 22' also provides services for the M2M gateway devices 14 and M2M terminal devices 18 in the field domain. It will be understood that the M2M service layer 22' may communicate with any number of M2M applications, M2M gateway devices, and M2M terminal devices. The M2M service layer 22' may interact with a service layer by a different service provider. The M2M service layer 22' may be implemented by one or more servers, computers, virtual machines (e.g., cloud/compute/storage farms, etc.) or the like.

Referring still to FIG. 12B, the M2M service layers 22 and 22' can provide a core set of service delivery capabilities that diverse applications and verticals can leverage. These service capabilities enable M2M applications 20 and 20' to interact with devices and perform functions such as data collection, data analysis, device management, security, billing, service/device discovery, etc. Essentially, these service capabilities can free the applications of the burden of implementing these functionalities, thus simplifying application development and reducing cost and time to market. The service layers 22 and 22' also may enable M2M applications 20 and 20' to communicate through various networks 12 and 12' in connection with the services that the service layers 22 and 22' provide.

The context manager of the present application may be implemented as part of a service layer. As used herein, a service layer may refer to a software middleware layer that supports value-added service capabilities through a set of Application Programming Interfaces (APIs) and underlying networking interfaces. Both ETSI M2M and one M2M use a service layer that may contain the context managers described herein. ETSI M2M's service layer is referred to as the Service Capability Layer (SCL). Embodiments described herein may be implemented as part of the SCL, wherein the messages may be based on various protocols such as, for example, MQTT or AMQP. The SCL may be implemented within an M2M device (where it is referred to as a device SCL (DSCL)), a gateway (where it is referred to as a gateway SCL (GSCL)) and/or a network node (where it is referred to as a network SCL (NSCL)). The one M2M service layer supports a set of Common Service Functions (CSFs) (e.g., service capabilities). An instantiation of a set of one or more particular types of CSFs is referred to as a Common Services Entity (CSE) which can be hosted on different types of network nodes (e.g. infrastructure node, middle node, application-specific node). Further, context management described herein can be implemented as part of an M2M network that uses a Service Oriented Architecture (SOA) and/or a resource-oriented architecture (ROA) to access. Further, the context managers of the present application can implemented as part of an M2M network that uses a Service Oriented Architecture (SOA) and/or a resource-oriented architecture (ROA) to access services such as the context manager of the present application.

The M2M applications 20 and 20' may include applications in various industries such as, without limitation, transportation, health and wellness, connected home, energy management, asset tracking, and security and surveillance. As mentioned above, the M2M service layer, running across the devices, gateways, and other servers of the system, supports functions such as, for example, data collection, device management, security, billing, location tracking/geofencing, device/service discovery, and legacy systems integration, and provides these functions as services to the M2M applications 20 and 20'.

Figure 12C:
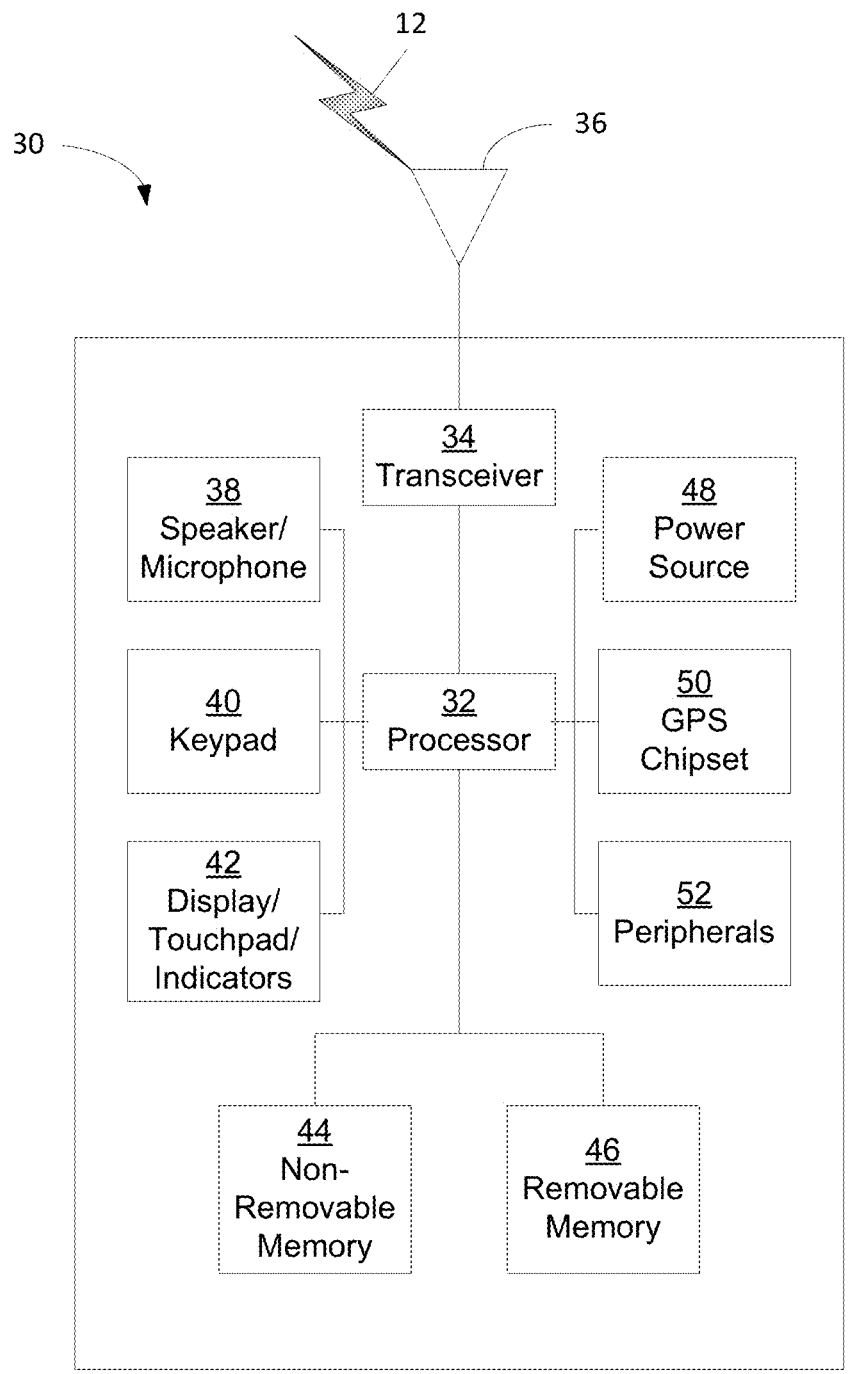
FIG. 12C is a system diagram of an example M2M/IoT terminal or gateway device or peer device that may be used within the communications system illustrated in FIG. 12A.

FIG. 12C is a system diagram of an example M2M device 30, such as an M2M terminal device 18 or an M2M gateway device 14 for example. The M2M device 30 may be configured as a network node for performing context management, for instance proxy-based context management, in accordance with the embodiments described above. As shown in FIG. 12C, the M2M device 30 may include a processor 32, a transceiver 34, a transmit/receive element 36, a speaker/microphone 38, a keypad 40, a display/touchpad/indicators 42, non-removable memory 44, removable memory 46, a power source 48, a global positioning system (GPS) chipset 50, and other peripherals 52. It will be appreciated that the M2M device 30 may include any sub-combination of the foregoing elements while remaining consistent with an embodiment. The display/touchpad/indicators 42 may be generally referred to as a user interface in accordance with an example embodiment. The user interface, which also may be referred to as a context management interface, may allow users to monitor, manage, and/or configure context management on a peer device, such as a gateway or other network node for example. For example, the user interface may enable a user to configure or trigger context information exchange and management between different peers. The user interface may be configured to display the above-described context information request frames or the context information response frames. Thus, various context parameters (e.g., context values, context IDs, number of remaining responses, etc.) may be displayed by the display/touchpad/indicators 42.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 32 may perform signal coding, data processing, power control, input/output processing, and/or any other functionality that enables the M2M device 30 to operate in a wireless environment. The processor 32 may be coupled to the transceiver 34, which may be coupled to the transmit/receive element 36. While FIG. 12C depicts the processor 32 and the transceiver 34 as separate components, it will be appreciated that the processor 32 and the transceiver 34 may be integrated together in an electronic package or chip. The processor 32 may perform application-layer programs (e.g., browsers) and/or radio access-layer (RAN) programs and/or communications. The processor 32 may perform security operations such as authentication, security key agreement, and/or cryptographic operations, such as at the access-layer and/or application layer for example.

The transmit/receive element 36 may be configured to transmit signals to, or receive signals from, an M2M service platform 22. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 12C as a single element, the M2M device 30 may include any number of transmit/receive elements 36. More specifically, the M2M device 30 may employ MIMO technology. Thus, in an embodiment, the M2M device 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the M2M device 30 may have multi-mode capabilities. Thus, the transceiver 34 may include multiple transceivers for enabling the M2M device 30 to communicate via multiple RATs, such as UTRA and IEEE 802.11, for example.

The processor 32 may access information from, and store data in, any type of suitable memory, such as the non-removable memory 44 and/or the removable memory 46. For example, the processor 32 may store and access context information, as described above, from the non-removable memory 44 and/or the removable memory 46 to determine whether there is context information that satisfies a context information request. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the M2M device 30, such as on a server or a home computer.

The processor 32 may receive power from the power source 48, and may be configured to distribute and/or control the power to the other components in the M2M device 30. The power source 48 may be any suitable device for powering the M2M device 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the M2M device 30. It will be appreciated that the M2M device 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include an accelerometer, an e-compass, a satellite transceiver, a sensor, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 12D:
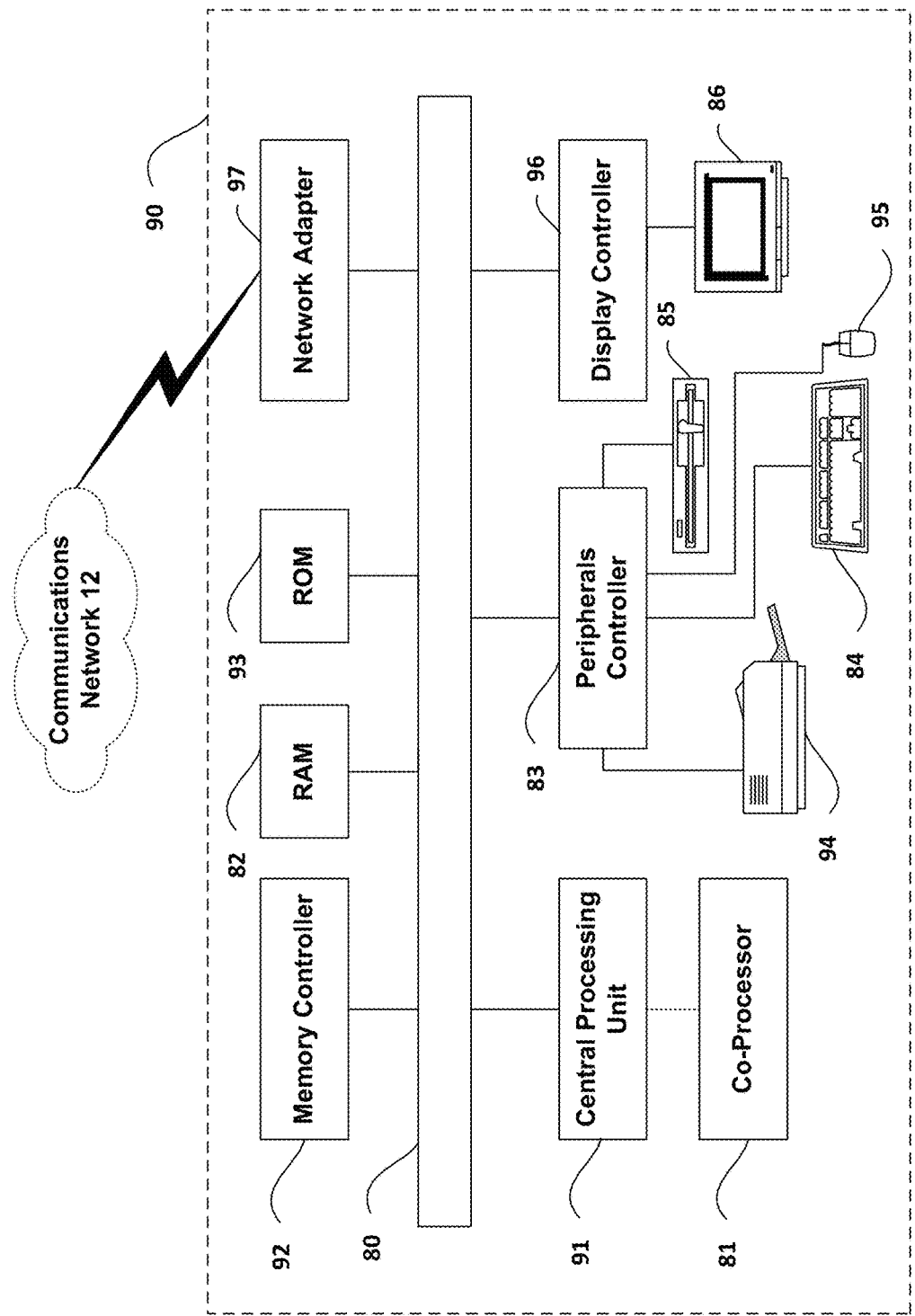
FIG. 12D is a block diagram of an example computing system in which aspects of the communication system of FIG. 12A may be embodied.

FIG. 12D is a block diagram of an exemplary computing system 90 on which, for example, the M2M service platform 22 of FIGS. 8A and 8B may be implemented. Computing system 90 may comprise a computer or server and may be controlled primarily by computer readable instructions, which may be in the form of software, wherever, or by whatever means such software is stored or accessed. Such computer readable instructions may be executed within central processing unit (CPU) 91 to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, that performs additional functions or assists CPU 91.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memory devices coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain network adaptor 97 that may be used to connect computing system 90 to an external communications network, such as network 12 of FIGS. 8A and 8B.

It is understood that any or all of the systems, methods and processes described herein may be embodied in the form of computer executable instructions (i.e., program code) stored on a computer-readable storage medium with instructions, when executed by a machine, such as a computer, server, M2M terminal device, M2M gateway device, or the like, perform and/or implement the systems, methods and processes described herein. Specifically, any of the steps, operations or functions described above may be implemented in the form of such computer executable instructions. Computer readable storage media include both volatile and nonvolatile, removable and non-removable media implemented in any method or technology for storage of information, but such computer readable storage media do not includes signals. Computer readable storage media include, but are not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other physical medium which can be used to store the desired information and which can be accessed by a computer.

In describing preferred embodiments of the subject matter of the present disclosure, as illustrated in the figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal languages of the claims. This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed:

1. In a system comprising a plurality of devices that communicate via peer-to-peer communications and that each include a respective context manager, a method comprising, at a first context manager of a first device of the plurality of devices:
sending an association request that includes an application identity associated with an application and a channel identity, so as to establish a session with a second context manager of a second device of the plurality of devices, the session established over a medium access control (MAC) layer using the application associated with the application identity, wherein the channel identity indicates a new channel for communication during the session;
after establishing the session with the second context manager of the second device, and during the session over the MAC layer, receiving a context information request frame comprising one or more parameters indicating a list of context operations requested to be performed by the first device, and a response requirement; and
generating, based on the context information request frame received during the session, a number of context information response frames indicating one or more context values that correspond to the list of context operations performed by the first device,
wherein the number of context information response frames corresponds to the response requirement.

2. The method as recited in claim 1, the method further comprising:
sending, during the session over the MAC layer, the context information response frames to the second context manager of the second device of the plurality of devices.

3. The method as recited in claim 2, wherein the context information request frame is received in response to the first device and the second device being within a proximity to each other.

4. The method as recited in claim 2, wherein the context information request frame is received in response to the first device and second device being within a proximity to a predetermined location.

5. The method as recited in claim 1, wherein the context information request frame is received via a context manager proxy.

6. The method as recited in claim 5, wherein a third device of the plurality of devices includes the context manager proxy.

7. The method as recited in claim 1, further comprising displaying a status of at least one of the context information request frame or the context information response frame.

8. A first peer device in a network of connected peer devices, the first peer device comprising:
a processor adapted to execute computer-readable instructions; and
a memory communicatively coupled to said processor, said memory having stored therein computer-readable instructions that, when executed by the processor, cause the processor to perform operations comprising:
sending an association request that includes an application identity associated with an application and a channel identity, so as to establish a session with a second context manager of a second device of the plurality of devices, the session established over a medium access control (MAC) layer using the application associated with the application identity, wherein the channel identity indicates a new channel for communication during the session;
after establishing the session with the second peer device, and during the session over the MAC layer, receiving a context information request frame comprising one or more parameters, the one or more parameters indicating a list of context operations requested to be performed by the first peer device, and a response requirement; and
generating, based on the context information request frame received during the session, a number of context information response frames indicating one or more context values that correspond to the list of context operations performed by the first peer device,
wherein the number of context information response frames corresponds to the response requirement.

9. The first peer device as recited in claim 8, the operations further comprising:
sending, during the session over the MAC layer, the context information response frames to a context manager of the second peer device in the network of connected peer devices.

10. The first peer device as recited in claim 9, wherein the context information request frame is received in response to the first peer device and the second peer device being within a proximity to each other.

11. The first peer device as recited in claim 10, wherein the context information request frame is received in response to the first peer device and the second peer device being within a proximity to a predetermined location.

12. The first peer device as recited in claim 8, wherein the context information request frame is received via a context manager proxy.

13. The first peer device as recited in claim 12, wherein a third device in the network of connected peer devices includes the context manager proxy.

14. The first peer device as recited in claim 8, the operations further comprising displaying a status of at least one of the context information request frame or the context information response frame.

* * * * *